United States Patent [19]

Oguma

[11] Patent Number: 4,466,312

[45] Date of Patent: Aug. 21, 1984

[54] SYSTEM FOR CONTROLLING TRANSMISSION RATIO OF TRANSMISSION FOR AUTOMOTIVE VEHICLES

[75] Inventor: Tomio Oguma, Anjo, Japan

[73] Assignee: Aisin Seiki Kabushiki Kaisha, Kariya, Japan

[21] Appl. No.: 267,558

[22] Filed: May 27, 1981

[30] Foreign Application Priority Data

May 27, 1980 [JP] Japan .................................. 55-69615
Jun. 18, 1980 [JP] Japan .................................. 55-81412

[51] Int. Cl.³ ...................... B60K 41/04; B60K 41/08; F16H 15/08
[52] U.S. Cl. ...................................... 74/868; 74/867; 74/201
[58] Field of Search .................. 74/690, 691, 199, 200, 74/201, 861, 868, 867, 869

[56] References Cited

U.S. PATENT DOCUMENTS

| | | | |
|---|---|---|---|
| 3,826,147 | 7/1974 | Sharpe et al. | 74/200 |
| 3,828,618 | 8/1974 | Sharpe et al. | 74/200 |
| 3,893,344 | 7/1975 | Dantlgraber et al. | 74/867 |
| 3,913,418 | 10/1975 | Miyao et al. | 74/867 |
| 3,949,627 | 4/1976 | Murakami | 74/867 |
| 3,952,614 | 4/1976 | Iijima | 74/868 |
| 3,958,466 | 5/1976 | Espenschied | 74/867 |
| 4,098,148 | 7/1978 | Wayman | 74/868 |
| 4,122,732 | 10/1978 | Chana | 74/861 |
| 4,228,691 | 10/1980 | Smirl | 474/12 |
| 4,257,441 | 3/1981 | Iwanaga et al. | 74/867 |
| 4,347,764 | 9/1982 | Lauven | 74/867 |

Primary Examiner—Lawrence J. Staab
Assistant Examiner—Bruce F. Wojciechowski
Attorney, Agent, or Firm—Oblon, Fisher, Spivak, McClelland & Maier

[57] ABSTRACT

A system for controlling the transmission ratio of an infinitely variable transmission in the present invention which includes an infinitely variable control of the transmission ratio e within a range between L and H positions which is accomplished by follow-up-wisely actuating a spring-backed spool in an actuator of transmission ratio control servo RCS against the spring force in accordance with the signal pressure established by the compensation valve through the equilibrium between pressures responsive to the vehicle speed and throttle opening;

a transmission characteristic diagram having a low ratio (L) fixed area, infinitely variable ratio area and high ratio (H) fixed area due to cooperation of the modulator valve 190 and kickdown valve 140; which system is capable of properly responding to gradual or sudden changes in throttle opening and vehicle speed; and expanding the low ratio (L) fixed area and infinitely variable area towards a higher speed area due to the regulating control to the vehicle speed responsive pressure by the hold valve operated by manual lock-up shifting in the manual select valve, which ratio area expanding allows for an effective shift down function responsive to any vehicle speed.

36 Claims, 15 Drawing Figures

A: FIXED RATIO (L) AREA
B,B1: INFINITELY VARIABLE AREA
C: FIXED RATIO (H) AREA

A: FIXED RATIO (L) AREA
B, B1: INFINITELY VARIABLE AREA
C: FIXED RATIO (H) AREA

SYSTEM FOR CONTROLLING TRANSMISSION RATIO OF TRANSMISSION FOR AUTOMOTIVE VEHICLES

BACKGROUND OF THE INVENTION

1. Field of the Invention

The present invention relates to a system for controlling the transmission ratio of a transmission, and more particularly to a system for controlling the transmission ratio of a mechanically operated infinitely or steplessly variable transmission for automotive vehicles.

2. Description of the Prior Art

The transmission ratio control of the infinitely variable transmission has heretofore been accomplished by means of a transmission ratio ("ratio" hereinafter) control actuator upon which hydraulic ratio control pressure from a flow rate control valve is applied. The ratio control pressure is produced by a flow rate control valve which is differentially amplified by a force exerted by the displacement of a cam operatively connected with a throttle valve and a counteracting output pressure of a hydraulic governor driven by an output shaft of a transmission. It is very difficult to design such control system as the ratio control actuator is directly driven by the differentially amplified pressure from the flow rate control valve. In other words, it is very difficult to obtain on the one hand a high governor pressure sufficient to drive a spool of the flow control valve, on the other hand to provide a long cam displacement, to precisely determine the spring strength of the flow control valve and to provide a sufficiently long stroke. In addition, a large force to depress an acceleration pedal is required by the long displacement of the cam. It is preferable to obtain a compensation control hydraulic pressure by pressing a pilot piston by means of an additional cam linked with a throttle valve if pressures for compensation such as differential compensation for throttle opening and compensation at starting are additionally applied to the ratio controlling pressure, i.e. actuator driving pressure. Still a greater force is required for depressing the acceleration pedal to provide compensation pressure in such case. Furthermore, the design of flow control valve becomes still more difficult if a well-balanced hydraulic pressure for the control of actuator would be generated by means of only one flow control valve into which a compensation control pressure is also input. Such drawbacks in the prior art make it also difficult to obtain a reliable ratio controlling system covering a wide transmission ratio range.

Particularly in a mechanically operated infinitely variable transmission, operation of the ratio control actuator requires a very large force due to its encountering a counteracting force exerted on a torque transmitting portion of the actuator. Such ratio control actuator is generally actuated and driven through hydraulic pressure, wherein it is desirable that this hydraulic pressure is kept stable without a pressure change over the whole range of the transmission ratio. Therefore, it is not desirable that the signal pressures be responsive to the throttle valve, the speed of which or the like are directly applied for actuating the ratio control actuator because such pressures are accompanied by low-high pressure changes.

Furthermore, there is much to be desired in the prior art to overcome a force toward undesired ratio changes produced by wheels when they suddenly fall into a recess during running and a reacting force is transmitted to the ratio control actuator via a transmitting mechanism.

As general requirements for the ratio control system for the infinitely variable transmission the following requirements should be satisfied for obtaining a highest output torque in the transmission output shaft at high load time such as starting, rapid acceleration, upgrade-rising and the like: to established or shift a region in the ratio when necessary where the ratio is fixed at a minimum, or when necessary to establish or shift a region where the ratio is fixed at a maximum. In this case, an infinitely variable region of the transmission ratio is to be established and shifted between both regions of the fixed low ratio region and fixed high ratio region while an infinite or stepless variable change is matched with an engine revolution number (r.p.m.) $N_E$ at each stage under a given vehicle speed.

Such requirements are essential for safe and effective running of an automotive vehicle, with which the infinitely variable transmission system should be provided for enabling extension of the fixed low ratio region towards a high speed or down shift at a middle or high speed under any circumstances requiring high output torque (high load) such as at starting, rapid or high acceleration, upgrade-ascending, or engine braking (at high speed running or downgrade-descending).

OBJECT OF THE INVENTION

Therefore, one object of the present invention is to provide a novel system for infinite (or stepless) variable transmission ratio control which can deviate from the aforementioned drawbacks in the prior art.

Another object of the present invention is to provide a reliable system for infinite variable transmission control covering a wide transmission ratio range.

A further object of the present invention is to provide a system for infinite variable transmission control in which a control signal pressure for actuator may be supplied separately from the driving pressure for the actuator of the transmission ratio controlling system.

A further object of the present invention is to provide the aforementioned system so as to include a transmission control servo means provided with a follow-up type actuator actuatable with an actuator control signal which is obtained in response to both a signal (pressure) responsive to the vehicle speed and a signal (pressure) responsive to the throttle opening.

A further object of the present invention is to provide such compact system wherein the control signal including a low pressure region responsive to throttle opening and vehicle speed allows the actuator to be actuated by a continuously high line pressure as an actuating pressure thereof.

A further object of the present invention is to provide such system as in which a minimum or maximum transmission ratio range may be set or shifted according to the requirements for providing the output shaft of the transmission with a maximum torque at high loading such as starting, sudden acceleration or slope ascending.

A further object of the present invention is to provide such system so as to be capable of matching with a engine revolution number (r.p.m.) under a given vehicle speed in a infinitely variable region of the transmission ratio between fixed high and low transmission ratio regions.

Still a further object of the present invention is to provide a system as aforementioned so as to meet general requirements for the transmission ratio control in the automotive vehicle.

Other objects of the present invention will become apparent in the disclosure and accompanying drawings of the invention.

SUMMARY OF THE INVENTION

The present invention realizes an infinite or stepless transmission ratio control system over a wide range by providing a transmission ratio control servo means including a follw-up type actuator controlled by an actuator control signal which is obtained in response to both a signal (pressure) responsive to (or indicative of) vehicle speed and a signal (pressure) responsive to the throttle opening, while the actuator is drived by a line pressure supplied separately from the servo means (or actuator) control signal. The control signal is supplied by a compensation valve to a controlling valve means arranged in the actuator for follow up control thereof, while the compensation valve receives both a pressure responsive to throttle opening and a pressure responsive to vehicle speed.

The system for controlling the transmission ratio of an infinitely variable transmission in the present invention includes:

First, an infinitely variable control of the transmission ratio e within a range between L and H positions which is accomplished by follow-up-wisely actuating a spring-backed spool in an actuator of transmission ratio control servo RCS against the spring force in accordance with the signal pressure established by the compensation valve through the equilibrium between pressures responsive to the vehicle speed and throttle opening;

Second, a transmission characteristic diagram having a low ratio (L) fixed area, infinitely variable ratio area and high ratio (H) fixed area due to cooperation of the modulator valve and kickdown valve; which system is capable of properly responding to gradual or sudden changes in throttle opening and vehicle speed;

Third, expanding the low ratio (L) fixed area and infinitely variable area towards a higher speed area due to the regulating control to the vehicle speed responsive pressure by the hold valve operated by manual lock-up shifting in the manual select valve, which ratio area expanding serves to effect the shift down function responsive to any vehicle speed. The whole functions provided by the system of the present invention are essential for driving a vehicle.

The system for controlling the transmission ratio of an infinitely variable transmission for automotive vehicles generally includes
- means for producing a line pressure,
- means for producing a pressure responsive to throttle opening,
- means for producing a pressure responsive to vehicle speed,
- means in the infinitely variable transmission for changing the transmission ratio thereof, and
- means optionally for manually selecting a shifting position.

The improvement according to the present invention is accomplished on the basis of such system.

In such system, the improvement of the present invention comprises:
servo means for controlling said transmission ratio changing means, the servo means being controlled by means of a spool which is operated in response to an input signal pressure thereon and controls the line pressure to be applied to drive the servo means;

valve means (i.e., a kickdown valve) for generating an output signal pressure responsive to a throttle opening responsive pressure;

a modulator valve which is actuated by means of a vehicle speed responsive pressure applied against a spring force and the output signal pressure of said valve means additionally exerted to said spring force, the modulator valve regulating said vehicle speed responsive pressure into an output pressure;

a compensation valve which regulates the line pressure into a regulated output pressure by means of said output pressure of the modulator valve and the throttle opening responsive pressure exerted against said output pressure of the modulator valve, said regulated output pressure acting against the modulator valve output pressure in the compensation valve thereby providing said input signal pressure of the servo means;

provided that said valve means (kickdown valve) output signal pressure is additionally exerted on the compensation valve against the modulator valve output pressure.

The present invention further provides such a system so as to further include a modulator valve which holds the output pressure thereof as a vehicle speed responsive pressure at zero within a predetermined vehicle speed responsive pressure, whereby a transmission ratio fixed area is established at a low vehicle speed side by fixing the servo means at a minimum transmission ratio position within the predetermined vehicle speed.

The present invention further provides such a system so as to further include hold valve means for genelating an output pressure as a second vehicle speed responsive pressure which pressure alternatively consists of either, when the line pressure is applied by means of the manual select valve, a regulated first vehicle speed responsive pressure, or, when no line pressure is applied, a nonregulated first vehicle speed responsive pressure. This system enables to establish the minimum transmission ratio fixed area at the low vehicle speed side and to expand the minimum ratio fixed area toward a high speed area through line pressure application to the hold valve means.

Other features of the present invention will become apparent in the disclosure hereinbelow and accompanying drawings.

BRIEF DESCRIPTION OF THE DRAWINGS

A preferred embodiment of the present invention will now be described by way of examples with reference to the accompanying drawings for better illustration of the invention and not limitation thereto, in which.

DETAILED DESCRIPTION OF THE PREFERRED EMBODIMENTS

Figure 1:
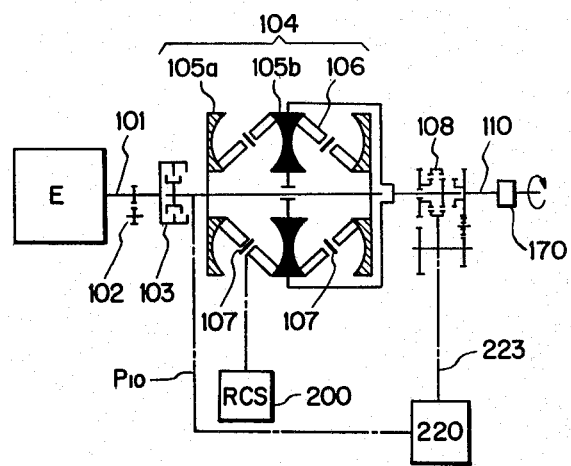
FIG. 1 is a schematic view showing the relation between a transmission and a transmission ratio control system of the present invention.

In FIG. 1, there is shown a gear train including a mechanical infinitely variable transmission 104 which is controlled by the transmission ratio control servo (RCS) 200 of the system of the present invention. A main pump 102 which is driven by an output shaft 101 of the engine E provides a line pressure source for the transmission ratio control system. Then the engine output shaft 101 is serial connected with an automatic starting clutch 103, mechanical (spherical surface friction type) transmission 104, forward and reverse changing gear 108. A governor valve 170 is connected with an output shaft 110 of the transmission 104 which is, in turn, connected with a final drive unit of a vehicle (not shown). The transmission 104 is of the spherical surface friction type in which a pair of opposing spherical discs 105a and 105b are frictionally coupled through rollers 106 rotatable with respect to an axis 107. The transmission ratio of the transmission 104 may be infinitely, i.e., steplessly, adjusted by changing the angle between rotation axes of rollers 106 and discs 105a and 105b by actuation of servo 220. The transmission 104 may include another type of infinitely variable transmissions such as cone-pulley gear, Graham type transmission, and Evans type transmission etc.

Figure 2A:
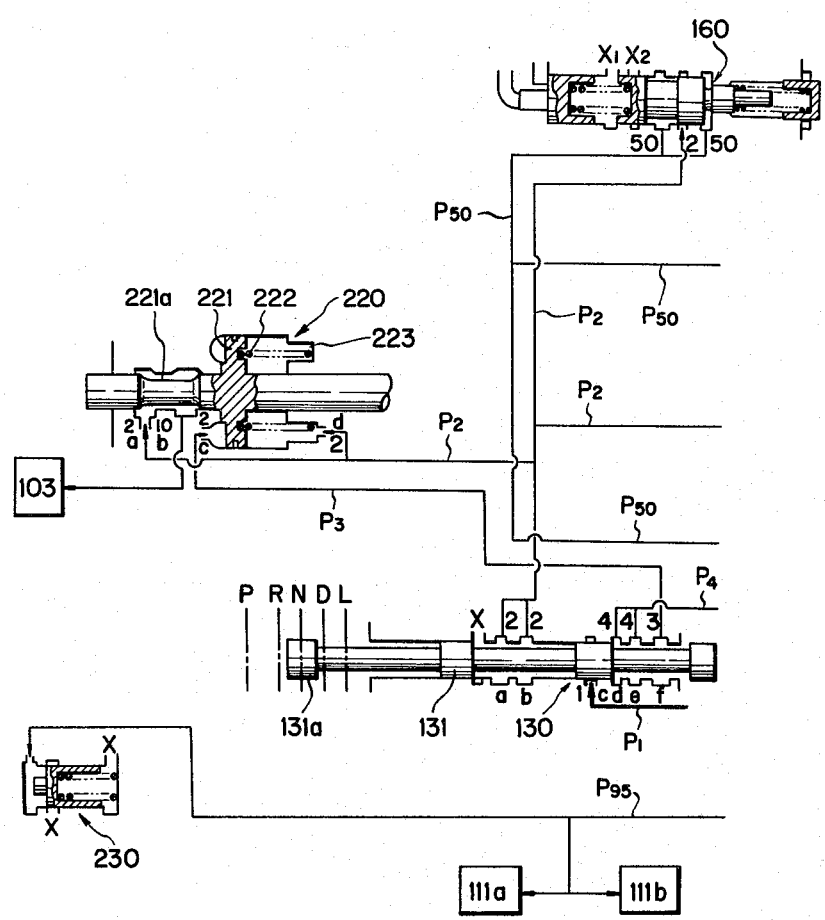
FIGS. 2A, 2B denote the hydraulic circuitry diagram of an embodiment of the present invention.
Figure 2B:
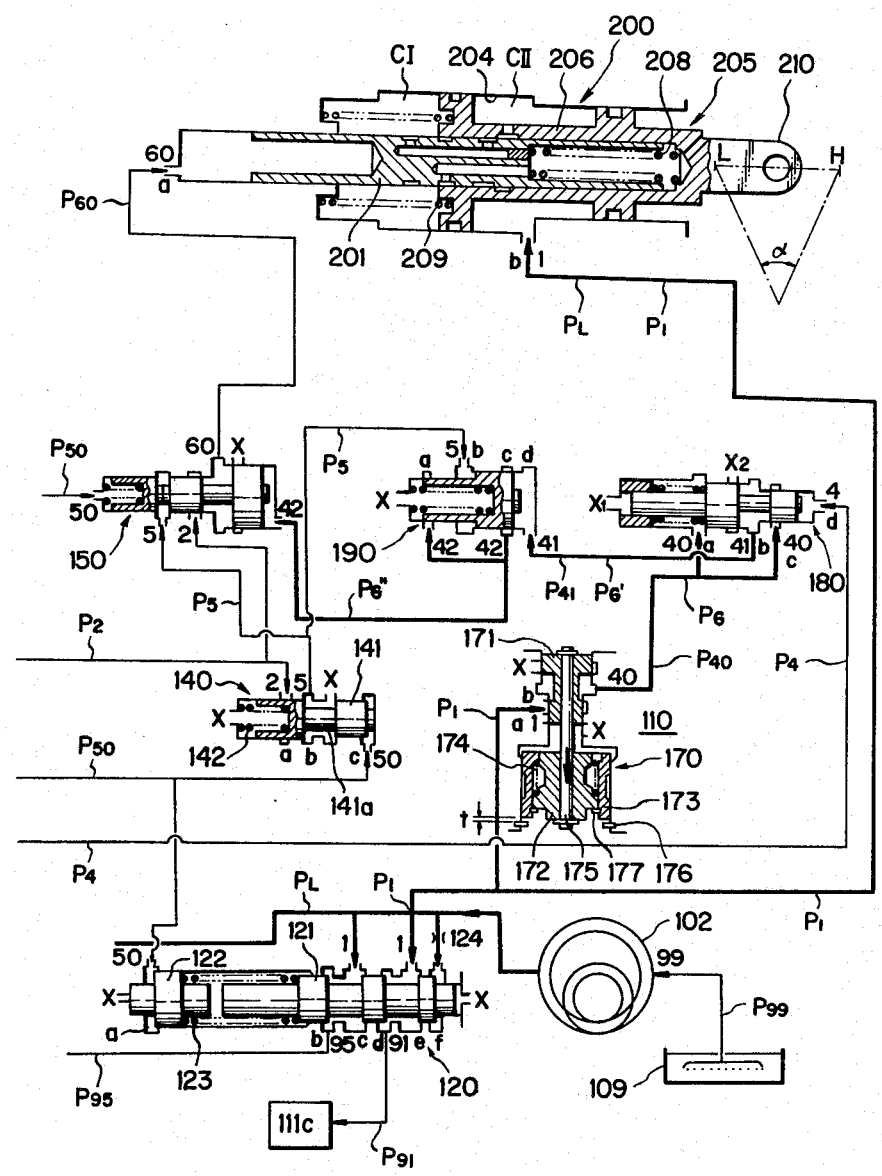

Now referring to FIG. 2, the main pump 102 supplies pressurized fluid functioning as a line pressure medium from an oil pump 109 to a line $P_1$ through a line $P_{99}$ in connection with the rotation of the engine E. The line $P_1$ is, in turn, connected with respective ports (1) of a pressure regulating valve 120, the governor valve 170, transmission ratio control servo (RCS) 200, and a manual select valve 130 for providing line pressure $P_L$ thereto. The main pump 102 may be a well known rotary or gear pump and the like. The discharge rate of the pump 102 is generally proportional to the r.p.m. thereof.

The pressure regulating valve 120 per se may be a known valve, and has spools 121 and 122 which are biased by a spring 123 therebetween. The spools 121 and 122 at opposite sides of the spring 123 provide pistons at ports a and f, respectively. Line P is connected to port f through an orifice 124 and an output line $P_{50}$ of a throttle valve 160 is connected to the port a of the valve 120. The orifice 124 is disposed for smoothing pulsed flow from the pump of line $P_1$. The line $P_1$ is also connected to ports c and e. The lines $P_{95}$ and $P_{91}$ are connected to ports b and d of the valve 120, respectively. The ports c and e are in communication with ports b and d, respectively, when the spool 121 is moved leftwardly. The line $P_{95}$ is connected to a relief valve 230, and is connected to a clutch or other lubricating systems 111a and 111b. The line $P_{91}$ is connected to the other lubricating system 111c. There are provided drain ports X at the opposite ends of the pressure regulating valve 120.

The pressure regulating valve 120 is adapted to regulate the line pressure $P_L$. When the discharge rate of main pump 102 and line pressure $P_L$ increase due to the increase in the r.p.m. of the engine, a leftward force is applied to the piston at port f against the spring 123 to urge the spool 121 leftwardly to open the ports b and d. Opening of ports b and d causes the fluid to be released into lines $P_{95}$ and $P_{91}$ so that the line pressure $P_L$ is lowered to be regulated. It is preferable to provide a time lag between the opening of ports b and d, so that the pressure regulation is accomplished by the opening of one port when the increase in line pressure $P_L$ is low, or alternatively the pressure regulation is accomplished by the opening of both ports b and d when the increase in line pressure $P_L$ is high.

The lines $P_{95}$ and $P_{91}$ generally connected to ports b and d are kept at a low pressure of less than 1 kg/cm². The line $P_{95}$ is kept at a pressure less than a predetermined value by means of the relief valve 230 which may be a conventional valve.

The line $P_{50}$ is connected to a port a so that the pressure (throttle pressure) $P_{TH}$ corresponding to the throttle opening is applied onto the piston surface of spool 122 from throttle valve 160. When the accelerator pedal is depressed to increase the throttle opening, throttle pressure $P_{TH}$ is increased to urge the spool 122 rightwardly and in turn to urge the spool 121 rightwardly through spring 123 to close the ports b and d of the valve 120. The line pressure $P_L$ tends to increase when the discharge rate of the main pump 102 according to the increase in the engine r.p.m. $N_E$ sequentially increases.

The governor valve 170 per se may be conventional valve as shown in FIG. 2. The valve 170 is provided on the output shaft 110 of the transmission 104 so that it is related together with the output shaft for establishing a hydraulic pressure responsive to vehicle speed. The body of the governor valve 170 is integral with the output shaft 110 of the transmission 104. The governor valve 170 comprises large and small diameter bore portions. The governor valve 170 has a drain port X, an input port a, an output port b, and a drain port $X_2$ in order from the center thereof at the small diameter bore portion. The governor valve 170 has at the large diameter bore portion thereof a cylindrical weight $W_1$ 172 coaxially linked with the spool 171 through a pin 175 normal to the output shaft 110 and a cylindrical weight $W_2$ 173 which is axially movable along the periphery of the weight $W_1$ 172. The weight $W_2$ 173 is engaged with the cylindrical weight 172 in an outer radial direction with respect to output shaft 110 through the spring 174. A snap 176 is retained in the large diameter bore portion with a small clearance t from the outer end of the weight $W_2$ 173 to prevent the weight $W_2$ 173 from moving in a radial and outer direction with respect to the output shaft 110.

Figure 7:
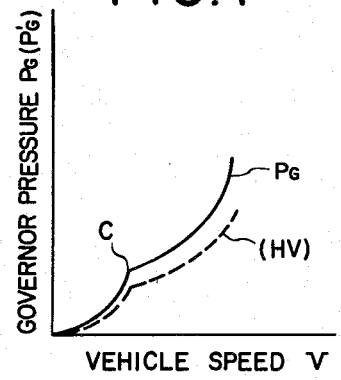
FIG. 7 is a graph showing the relation between output signal (secondary vehicle speed responsive pressure) $P_G'$ from the hold valve and vehicle speed V wherein a curve $P_G$ represents governor pressure (primary vehicle speed responsive pressure)

A centrifugal force on the weights is established simultaneously with the rotation of the output shaft 110. The centrifugal force proportional to the r.p.m. of the output shaft or vehicle speed V is applied upon the pin 175 in a direction as shown by an arrow in FIG. 2. On the other hand, the line pressure $P_L$ is introduced to the port a of valve 170 through line $P_1$ so that the opening of a passage between ports a and b increases in accordance with the increase in the vehicle speed V. Accordingly a governor pressure $P_G$ is generated as an output signal in response to the vehicle speed V as shown in FIG. 7.

The port b may be connected to an inlet port e of the compensation valve 150 via line $P_{42}$ through hold valve 180, line $P_{41}$ and modulator valve 190 if desired. In this case, governor pressure $P_G$ which has been modulated and controlled is applied to the compensation valve 150 as a signal pressure.

The weight $W_2$ 173 of the governor 170 is offset by the weight $W_1$ 172 through the spring 173 when a centrifugal force is slightly applied to the weight $W_2$ 173 in a direction as shown by an arrow. The weight $W_1$ 172 is stopped by a snap 177 so that a centrifugal force proportional to the mass $(W_1+W_2)$ is applied upon the pin 175. When the r.p.m. of the output shaft 110 is further increased, the weight $W_2$ 173 is blocked by a pin 176 so that the centrifugal force is couterbalanced by the output shaft 110. After passing point c in FIG. 7, the weight $W_1$ 172 plus the biasing force of the spring 174 act upon a pin 175, and a governor pressure $P_G$ is established as shown by a curve GV in FIG. 7.

The manual select valve (manual operation responsive valve) 130 comprises a body having a drain port X, ports a–f in order from left to right and a spool 131 with a manually select knob 131a. The spool 131 is shiftable to various positions such as parking position P, reverse position R, neutral position N, drive position D and lockup position L. The line $P_1$ is connected with a port c of the manual select valve 130. The ports a and b are connected through line $P_2$ to ports a and d of the servo 220, port b of throttle valve 160, port a of a kickdown valve 140, and port a of compensation valve 150.

In the neutral position N of the valve 130, the port c is closed. Ports a and b are in communication with the drain X. No pressure is applied to ports d–f. In the drive position D of valve 130, the port c is in communication with ports a and b. The drain X is closed. No pressure is applied to ports d–f. In the lockup position L, the drain X, ports a and e are closed, and ports b and d are in communication with the port c, and no pressure is applied to the port f.

In the reverse position R, no pressure is applied to ports a and b which are in communication with the drain X (open). The port c is in communication with ports d–f for establishing the line pressure $P_L$.

In the parking position P, the port a is in communication with the drain X (open). Ports b and f are closed and port c is in communication with ports d and e.

Ports d and e of the manual select valve 130 may be connected to a port of hold valve 180 via line $P_4$ (if desired) so that additional control of governor pressure $P_G$ (Lockup) may be accomplished. Port f of manual select valve 130 is connected to a port c of a servo valve 220 via a line $P_3$.

The servo valve 220 comprises a body having ports a to d and a servo piston 221 having one end biased by a spring 222. The servo piston 221 is movable against the spring 222 rightwardly by a hydraulic pressure applied to the port c.

The piston 221 in the left position as shown in FIG. 2 is for forward movement of the vehicle. The piston 221 in the right position is for reverse movement of the vehicle. The piston 221 is integral with a folk shaft 223 of the forward and reverse changing gear 108 or operatively connected with a folk shaft through a link mechanism. The port a is in communication with the port b in the left (forward) position of the piston 221. The port b is connected with an actuator for the automatic clutch 103 via line $P_{10}$ (FIG. 1).

Actuation of the servo valve 220 is controlled by the manual select valve 130. When the shift knob 131a of the manual select valve 130 is in position N, the pressure from line $P_3$ is not applied to port c of servo valve 220. The piston 221 is retained at a forward position. Since no pressure is applied to ports a and b which are in communication each other, the starting clutch 103 is in a disengagement position.

When the shift knob 131a of the manual select valve 130 is in position D or L, the piston 221 is in the forward position. In position D, the ports a and b of manual select valve 130 are in communication with the port c. The line pressure $P_L$ is applied to ports a and d via the line $P_1$, the manual select valve 130, and a line $P_2$. Line pressure $P_L$ is applied to the automatic clutch 103 via ports a–b and a line $P_{10}$ so that the clutch 103 is in a engagement position. Line pressure $P_L$ applied to port d additionally acts on a spring 222 to hold the piston 221 at the forward position.

When the knob 131b is in position L, the line communication is identical with that in position D except for the fact that port a of the manual select valve is closed. The flow rate of the fluid from the line $P_1$ to $P_2$ is slightly restricted so that a slightly lower line pressure $P_L$ is supplied to a line $P_{10}$ connected with the clutch 103.

In position R, line pressure $P_L$ is applied to the port c of the servo valve 220, which is in communication with ports c and d of the manual select valve 130 through the line $P_3$. The piston 221 is moved rightwardly to reverse position against the spring 222. At the same time the port c is brought into communication with the line $P_{10}$ so that line pressure $P_L$ is applied to the clutch 103. At this time, no pressure is applied to the port d (at the side of the piston spring) of the servo valve 220 since the line $P_2$ is in communication with drain X via ports a and b of the manual select valve 130.

Figure 4A:
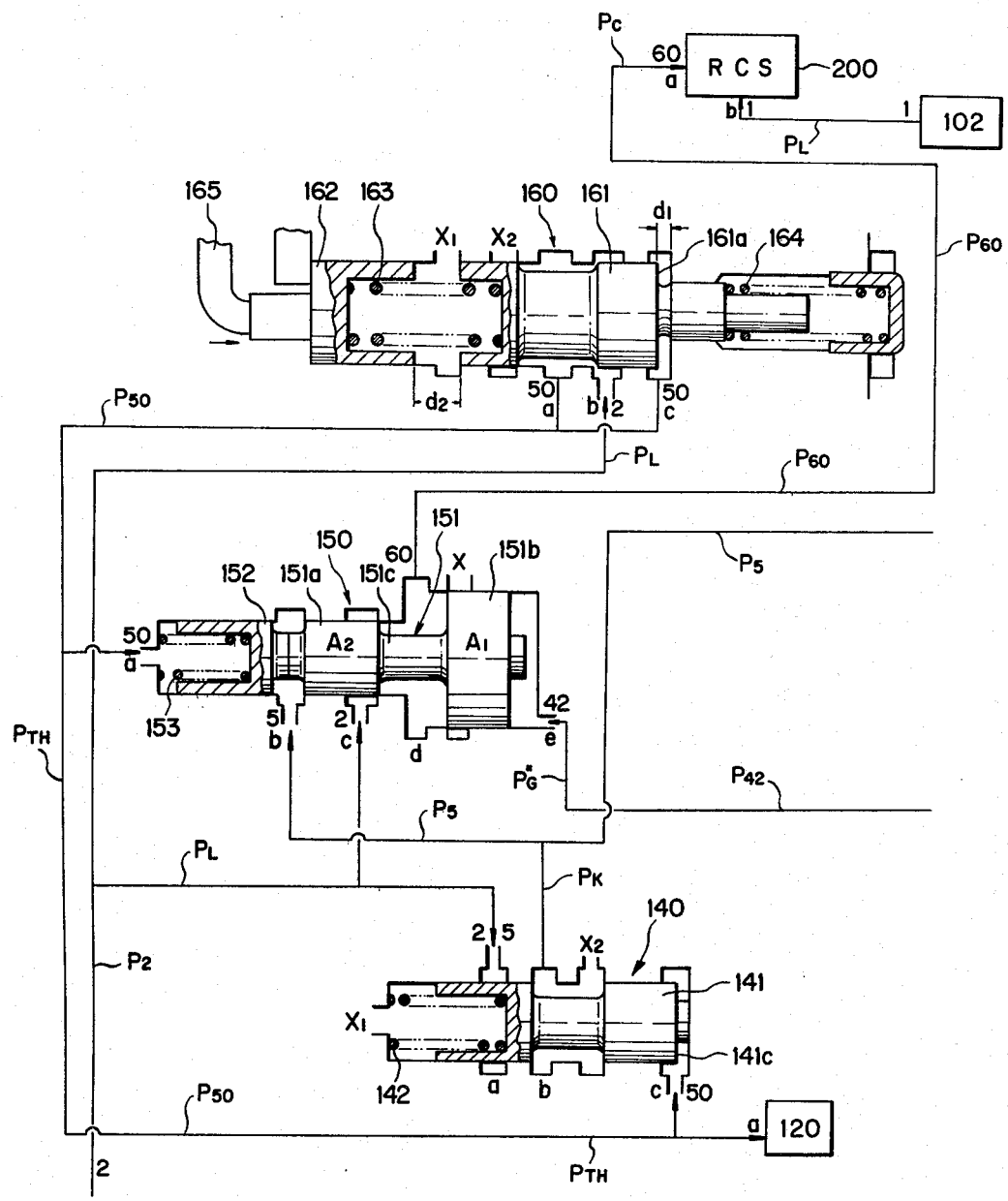
FIGS. 4A, 4B are enlarged schematic views showing a transmission ratio control device comprising a throttle valve, compensation valve, kickdown valve, modulator valve, and hold valve.
Figure 4B:
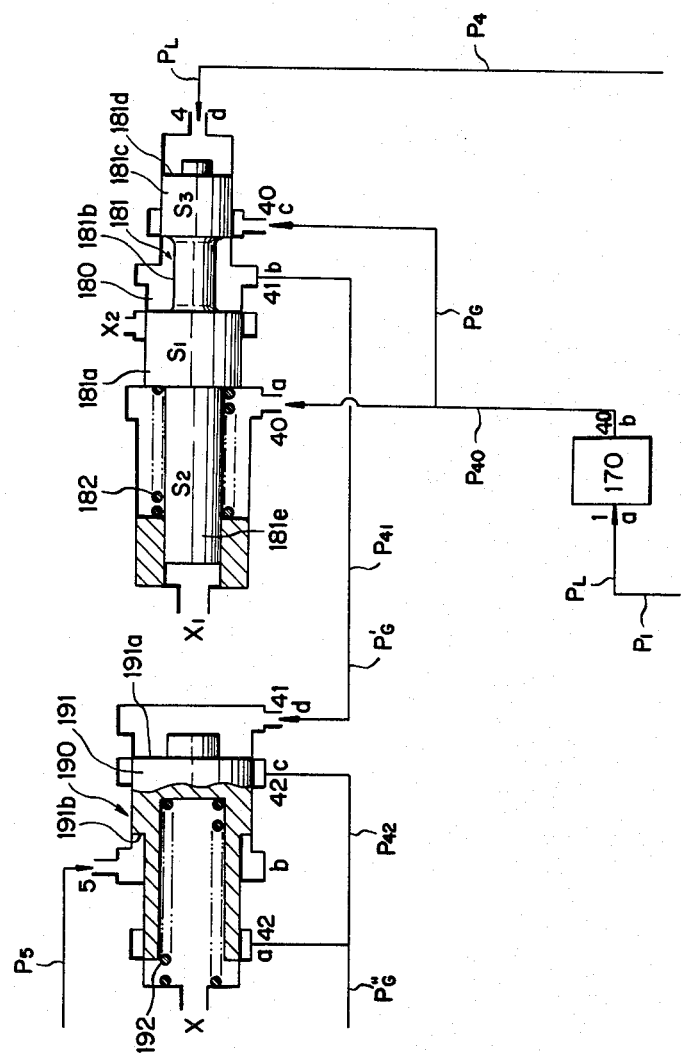

The throttle valve 160 per se may be a known valve. As shown in FIG. 4, the throttle valve 160 comprises a body having drain ports $X_1$ and $X_2$, ports a–c in order and a spool 161, having one end biased by a spring 164 and the other end biased by a spring 163 as shown in FIG. 4 in detail. The spring 163 is disposed between spools 161 and 162 in a compressed manner and is subject to a rightward biasing force proportional to the throttle opening by means of an arm 165 operatively connected with a throttle actuating mechanism (not shown). A drain port $X_1$ is disposed in a spacing $d_2$ between spools 161 and 162. A drain port $X_2$, ports a–c are disposed over an area within which the spool 161 is movable. The spool 161 has a piston portion 161a at the port c.

The port b of the throttle valve 160 is in communication with ports a and b of the manual select valve 130 through the line $P_2$. On application of line pressure upon the port b from the line $P_2$, ports b and a are in communication through a minimum opening, and the port $X_2$ is closed. On application of no line pressure $P_L$ to the line $P_2$, the piston portion 161a is abutted to the end plate of the body. The spacing $d_1$ is zero.

When the acceleration pedal is depressed, arm 165 urges the spool 162 in a direction shown by an arrow through link means (not shown) and in turn urges the spool 161 rightwardly as shown by an arrow through the spring 163. As a result, the opening of passage between ports a and b increases so that a signal pressure (throttle pressure $P_{TH}$) is established in the port a corresponding to the throttle opening (displacement of an acceleration pedal). The port a is then in communication with the port c via line $P_{50}$. A force is thus applied to piston portion 161a in such a direction that it will prevent the increase in throttle pressure $P_{TH}$ each time when the throttle pressure $P_{TH}$ increases. The drain port $X_2$ is disposed so as to prevent the throttle pressure $P_{TH}$ from changing (increasing) independently of the line pressure $P_2$ as well as independently of the throttle opening. When the urging force of the piston portion 161a exceeds the biasing force of the spring 163 responsive to a throttle opening, the port b is rendered into communication with the port $X_2$ to regulate the throttle pressure $P_{TH}$ responsive to the throttle opening. The port b is in turn in communication with port a of a compensation valve 150, port a of the pressure regulator valve 120 and a port c of the kickdown valve 140 respectively, via the port a of the valve 160 and line $P_{50}$.

The compensation valve 150 has two spools 151 and 152 within a stepped cylinder having ports a–d, X, and e thereon. The spool 152 is biased by a spring 153 at the end adjacent to the port a and counteracts against a small diameter piston 151a of the spool 151 at the port b. The spool 151 comprises a small diameter piston 151a, a large diameter piston 151b and a shaft 151c therebetween. The cylinder has the port c at an area within which the small diameter piston 151a is movable, and ports d, X and e along the large diameter piston 151b. The port e opens to a space at the right side of the large diameter piston 151b. The port d is rendered in communication with the port X, simultaneously being the port c rendered into closed relationship with the port d by a rightward movement of the spool 151. Ports c and d are rendered into open position simultaneously being the drain port X (in turn ports d and X) rendered into closed position by a leftward movement of the spool 151.

The line $P_{50}$ (from port a of throttle valve 160) is connected to the port a of the compensation valve 150 for supplying the throttle pressure $P_{TH}$. The line $P_5$ from the port b of the kickdown valve is connected to the port b of the valve 150. The port b of the valve 150 is also connected to a port of a modulator 190. The line $P_2$ from ports a and b of the manual select valve 130 is connected with the port c. Line $P_{42}$ having a signal source in the governor valve 170 is connected to the port e of the valve 150. The line $P_{60}$ is connected to the port a of the transmission ratio control servo (RCS) 200 for supplying an output signal pressure from the compensation valve 150.

At the port b of the compensation valve 150 the shaft of spools 152 is abutted to that of the small diameter spool 151. Both spools have opposing piston surfaces upon which a pressure through the line $P_5$ is applied.

The compensation valve 150 comprises a spool 151 having an end to which a vehicle speed responsive pressure (governor pressure $P_G$ or modulated pressure $P_{42}$) is applied and the opposite end to which the throttle pressure $P_{TH}$ responsive to the throttle opening is applied in accordance with the throttle opening. The spool 151 regulates the line pressure $P_L$ to provide an output pressure from the port d by closing or opening drain ports X and the inlet port c. The regulated pressure urges the spool 151 against the vehicle speed responsive pressure to reach an equilibrium.

The equilibrium relation between acting forces on the spool 151 of the compensation valve 150 is represented by equation (1). An output pressure $P_C$ from the compensation valve 150 is represented by equation (2).

$$f + (A_1 - A_2)P_C + A_2 P_{TH} = A_1 P''_G \quad (1)$$

$$P_C = \frac{1}{A_1 - A_2}(A_1 P''_G = A_2 P_{TH} - f) \quad (2)$$

wherein representing:
 f: biasing force of the spring 153
 $A_1$: sectional area of piston 151b
 $A_2$: sectional area of spool 152 and
 $P''_G$: governor pressure in line $P_{42}$ When the throttle opening is ⅝-8/8 (kickdown), a signal pressure $P_K = P_L$ is applied to port b via line $P_5$ to move the spool 151 rightward. At this instance the following equation (3) is established and the output pressure $P_L$ is represented by equation (4). For simplification, the sectional area of the piston 151a of spool 151 is assumed to be equal to the sectional area A, of the spool 152. This is not an essential requirement.

$$A_2 \cdot P_L + (A_1 - A_2)P_L = A_1 P''_G \quad (3)$$

$$P_L = \frac{1}{A_1 - A_2}(A_1 P''_G - A_2 P_L) \quad (4)$$

As a result, pressure $P_L$ when the throttle opening is 0 is less than 0/8-⅝ is higher than that in kickdown (throttle opening ⅝-8/8) such a relation is a basic purpose of the kickdown valve 140 and basic function for the compensation valve 150. (Refer to paragraph of kickdown valve.)

Figure 3:
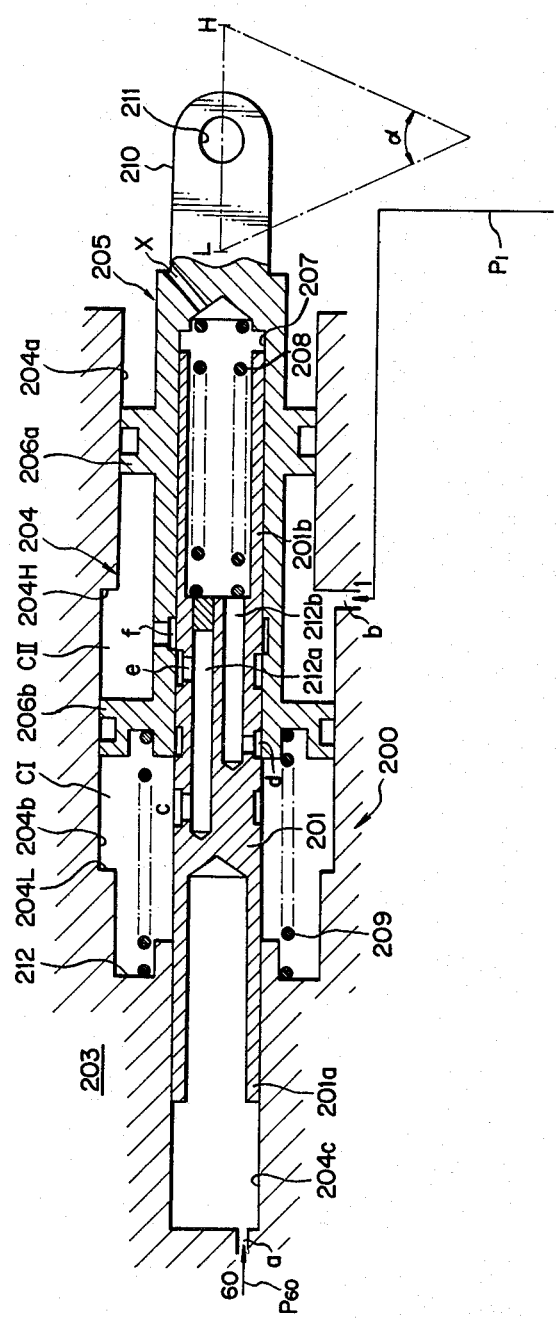
FIG. 3 is an enlarged cross sectional view showing the transmission ratio control servo shown in FIG. 1.

The transmission ratio control servo 200 which is a follow-up type servo comprises an actuator 205 which is axially movable within a cylinder 204 (204a, 204b) bored in a body 203 and a spool 201 axially movable in the center bore 207 of the actuator 205 and in a small diameter cylinder 204 as shown in FIG. 3 in detail. The spool 201 is biased toward the cylinder bottom by means of a compression spring 208.

A small diametered bottom cylinder 204c formed at the bottom of the recess 212 is provided with a port a at the bottom thereof. The signal pressure $P_L$ is applied to the port a from the compensation valve 150 via the line $P_{60}$. The actuator 205 has spaced pistons 206a and 206b which are slidably disposed in cylinders 204a and 204b respectively. The actuator 205 is biased toward the cylinder head by a spring 209 retained in a recess 212 of the cylinder 204b. The body 203 is provided with a port b at an area within which a second chamber CII defined by pistons 206a and 206b is movable. The port b is connected with the delivery port of the main pump 102 via the line $P_1$ so that the port b is subject to line pressure $P_L$. An arm 210 having a link hole 211 extends from the cylinder head end of the actuator 205. The arm 210 is linked with transmission ratio changing means (for example, spherical surface type transmission 104 as shown in FIG. 1) via link means (not shown) so that the forward and reverse movement of the actuator 205 between positions L and H allows the infinitely variable transmission 104 to be controlled.

The actuator 205 has a predetermined ratio of effective sectional areas with respect to pistons 206a and 206b. The actuator 205 has a port f communicated with a center bore 207 between pistons 206a and 206b, i.e., in the area of the second chamber CII and has a drain port X at the bottom of center bore 207.

The spool 201 comprises a hollow cylindrical portion 201a slidably adapted in the small diametered bottom cylinder 204c, a hollow cylindrical portion (spring receiving portion) 201b having an open end slidably adapted in actuator center bore 207, and an intermediate portion therebetween. At the intermediate portion there are provided small passages 212a and 212b which extend in an axial direction. The small passage 212a communicates the port c with the port e. The small passage 212b communicates the hollow area of the spring support portion 201b with the port d of the intermediate portion. Ports e and f open to communicate when the spool 201 is biased rightwardly in FIG. 3. The port d is adapted to open when the spool 201 is retracted leftwardly or the actuator is moved rightwardly. The port c is disposed in spaced relationship with the port d so that the port c opens in the cylinder 204b housing the spring 209 as shown in FIG. 3 and the port c closes when the spool 201 has moved by predetermined length after the closing of port d.

The piston 206b has a pressure receiving sectional area (effective section) larger than that of the piston 206a. The actuator 205 moves to the cylinder bottom (left) against the biasing force of the spring 209 when a sufficiently high line pressure $P_L$ is applied to the cylinder bore 204c via the port b. Such leftward movement of the actuator 205 causes the ports f and e to communicate and causes the pressurized fluid to flow into the cylinder 204b (left chamber CI) via the passage 212a and port c. The equilibrium between pressures applied to the right and left sides of piston 206b is recovered by such fluid flow so that the actuator 205 moved in an opposite direction (right) by the spring 209 to pass the original position and further move rightwardly. As the result, ports f and e will close and the port d will open. The pressurized fluid from the left cylinder 204b is discharged to the small passage 212b, center bore 207 and drain port X. The pressure in the left cylinder chamber (first chamber CI) of the piston 206b is lowered again. The biasing force of spring 209 will become equal to the biasing force due to the difference between pressure receiving sectional areas (effective pressure receiving sectional area) of pistons 206b and 206a so that the actuator will not move rightwardly. Reciprocative motion between positions L and H of the link hole 211 of the actuator 205 is converted into change in angle of roller shaft 107 of the transmission 104 by the link. Simultation of opening and closing of ports e and f with close and open of the port d (zerolapping) will cause the most preferable precision of control.

Kickdown valve 140 which serves as valve means for generating an output signal pressure responsive to a throttle opening responsive pressure is actuated in accordance with a given throttle opening response pressure. The valve 140 generates a given output signal pressure. The kickdown valve 140 comprises a cylinder body having a drain port x, ports a and b, a drain port $x_2$, port c thereon serially form the left to right, and a spool 141 having a piston 141c at port c and a diameter reduced portion 141a communicating ports b and $x_2$.

The spool 141 is biased by spring 142 at the left end. Port a is communicated with ports a and b of the manual valve 130 via line $P_2$. Port b is communicated with port b of the compensation valve 150 and port b of the modulator valve via line $P_5$. Port c is communicated with ports a and c of throttle valve. Ports b and $x_2$ communicate with each other on application of no pressure ($P_{TH}=0$) to port c. The spring 142 is adjusted so that the spool 141 moves leftwards when the throttle pressure $P_{TH}$ reaches a pressure $\frac{5}{8}$ corresponding to a given throttle opening (for example $\frac{5}{8}$). Thus, the spool 141 actuates only when the throttle opening is $\frac{5}{8}$-8/8 (full opening) the range of which is preset as equivalent to the opening at kickdown.

Ports a and b are brought into communication by the leftward movement of the spool 141. Simultaneously drain port $x_2$ (passage between ports b and $x_2$) is closed. Accordingly, the kickdown valve output pressure $P_K=P_L$ is established in the line $P_5$ by the kickdown valve 140 when the throttle opening is $\frac{5}{8}$-8/8. Pressure $P_K$ is zero when the throttle opening is 0 or less than $\frac{5}{8}$.

The modulator valve 190 comprises a cylinder body having drain port x, ports a–d successively disposed from the left side and a spool 191 movablly disposed therein. The spool 191 has a piston 191a at the side of port d and the piston 191b at the side of port b. The spool 191 is adapted to control the opening of the passage communicating ports c and d and to close port a simultaneously. Ports a and b do not open or close simultaneously (zerolapping), and ports a and c communicates with each other via line $P_{42}$. Ports a and x communicate each other when the port a is opened to cause the signal pressure $P_G''$ in the line $P_{42}$ to get zero.

The signal pressure $P_G'$ is applied to port d from port b of the hold valve 180 via the line $P_{41}$. Ports a and c communicate with port e of compensation valve 150 via line $P_{45}$ to provide compensation valve with a signal pressure $P_G''$ obtained by modulating signal pressure $P_G'$ (second vehicle speed responsive pressure) which has been obtained by regulating the governor pressure $P_G$ by means of the hold valve 180.

The force of a spring 192 is preset so that port c is kept closed until the force upon the piston 191a exerted by the input pressure $P_G'$ in the line $P_{41}$ reaches a given vehicle speed responsive pressure $P_{MV}$ (for example a vehicle speed V = about 10 km/h). As a result, the signal pressure $P_G''$ from the modulator valve 190 is kept zero until the input signal pressure reaches a pressure corresponding to a given vehicle speed $V_{MV}$. When the signal pressure $P_G'$ reaches $P_{MV}$, the output signal pressure $P_G''=P_{MV}$ is established in the line $P_{42}$ by the opening of port c. Thereafter the signal pressure $P_G''$ increases with an increase in vehicle speed as shown in tracing MV in FIG. 9 having a raised portion resulting in a modulated pressure slightly lower than input signal pressure $P_G'$ of the modulator valve 190 (or hold valve output pressure, or governor pressure when hold valve is not used).

Port b of the modulator valve 190 is communicated with port b of the kickdown valve 140 via the line $P_5$ so that an output pressure $P_K=P_1$ (line pressure) is introduced into port b on an actuation of the kickdown valve 140 (throttle opening $\frac{5}{8}$-full opening) to exert pressure upon piston 191b. The spool 191 is moved rightwards by the force exerted by the pressure and the spring 192 to close port c and to open a passage between ports a and x. At this time the output signal pressure $P_G''$ from the line $P_{42}$ becomes zero.

The hold valve 180 comprises a cylinder body having a drain port $x_1$, a port a, a drain port $x_2$, ports b, c, d successively from the left side and a spool 181 movably disposed in the cylinder. The spool 181 is biased rightward by a spring 182 and has a reduced diametered spring guide 181e, a piston 181a, a diameter reduced portion 181b, and a piston 181c. The working surface of piston 181a is disposed in port a. The opposing working surfaces of pistons 181a and 181c are disposed in port b. The surface 181d of piston 181c is disposed in port d. Ports a and c is communicated with port b of the governor valve 170 via line $P_{40}$ to receive the (first) vehicle speed responsive pressure $P_G$ as input signal pressure. Port d is communicated with ports d and e of the manual select valve 130 via the line $P_4$ so that port d is applied with the line pressure $P_L$ when the shift knob 131a of the manual select valve is in portion L or R.

When the line pressure $P_L$ is introduced to port d, the spool 181 is moved leftwards to control the port c between closed and patial opened positions. The passage between ports b and $x_2$ communicates simultaneously with the closing of the passage between ports b and c. The port c gets closed when the line pressure $P_L$ is higher than a given value. No pressure is introduced to port c at the positions N and D of the manual select valve. The position of the spool 181 is determined by the balance between leftward forces exerted by the spring 182 and governor pressure $P_G$ onto the piston 181a, and rightward forces of the piston 181a exerted by output pressure $P_G'$ minus reaction force upon piston 181c. Port c is held in an appropriate open position to supply the modulator valve 190 via the line $P_{41}$ with a signal pressure $P_G'$ equal to the input pressure $P_G$ when the manual select valve 130 is in position D. Accordingly the hold valve 180 does not participate in particular control as far as the manual select valve 130 is in position D.

On the other hand, the line pressure $P_L$ is introduced to port d via the line $P_4$ when the manual valve 130 is in positions L (lock up) and R (reverse). The following equation is established concerning the sppool 181 when the line pressure $P_L$ is introduced to port d.

$$f + (S_1 - S_2)P_G = (S_1 - S_3)P'_G + S_3 P_L \quad (5)$$

Reference f represents the force exerted by the spring, $S_1$ total sectional area of piston 181a, $S_2$ sectional area of the spring guide 181e, and $S_3$ sectional area of the piston in port d.

Thus the output pressure $P_G'$ from the port b of the hold valve 180 is expressed by the equation (6)

$$P'_G = \frac{1}{S_1 - S_3}\{(S_1 - S_2)P_G + f - S_3 P_L\} \quad (6)$$

The pressure $P_G'$ is a vehicle speed responsive pressure as is shown by tracing HV in FIG. 7 and is supplied to port d of the modulator valve 190 as a driving pressure for the spool 191.

In operation the manual select valve 130 is linked with a shift lever (not shown) through link means so as to be manually actuated. In a neutral position N of the valve 130, the servo valve 220 (valve for changing forward and reverse movement) is in a position for forward movement by the biasing force of the spring 222. Since the line $P_1$ is closed by the manual valve 130.

Figure 6:
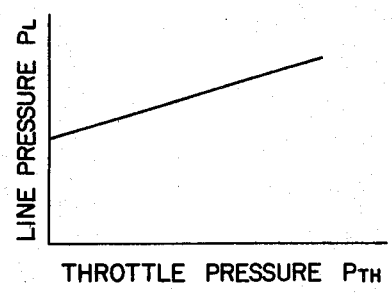
FIG. 6 is a graph showing the relation between throttle pressure $P_{TH}$ (throttle opening responsive pressure) and line pressure $P_L$ regulated by pressure regulating valve.

When the engine E is started, the main pump 102 begins to rotate for establishing a line pressure $P_L$ in the line $P_1$. The main pump 102 will increase the delivery rate in proportion to r.p.m. ($N_E$) of the engine, and produce the line pressure $P_C$ regulated by the pressure regulating valve 120. The line pressure $P_L$ is also amplified in response to the displacement of the accelerator pedal (throttle opening) by the application of the throttle pressure $P_{TH}$ corresponding to the throttle opening upon the pressure regulating valve 120. The relationship between the line pressure $P_{TH}$ and the throttle opening is shown in FIG. 6. The line pressure $P_L$ is applied to the port b of the transmission ratio control servo (RCS) 200 via the line $P_1$. Although the throttle is opened by depressing the accelerator pedal at the start of the engine, the compensation valve 150 establishes no pressure in the line $P_{60}$ since the line $P_2$ as a pressure source of the throttle valve 160 is not pressurized in the neutral position N of the manual select valve 130 and the throttle pressure $P_{TH}$ is zero. Accordingly the spool 201 is biased leftward by means of the spring 208 to abut the bottom end of the small bottom cylinder 204c. Under such condition, the piston 206b of the actuator 205 of RCS is applied with the line pressure $P_L$ from the port b so that it is retracted to the left position L (L position of the transmission gear ratio e) in FIG. 3 and stops at position c after abutment with the stepped portion 204L of the left cylinder. At this instant, the ports f and e open to communicate each other. Hydraulic fluid will flow into the left (first) chamber CI via the small path 212a and port c, so that the fluid pressure become equal to the pressure $P_L$. As a result, the resultant force of biasing force of the spring 209 and the force applied upon the left cylinder CI in an H direction exceeds the force in an L direction to urge the actuator 205 in an H direction. Such movement in the H direction results in a rapid drop in pressure in the left cylinder 204b since the port d opens to communicate with the drain X. The original pressure relation (low pressure in the left cylinder CI) is then established. Although the actuator will move to the left it is blocked by the shoulder 204L to stop at the position L defining a minimum transmission (gear) ratio e.

The line pressure $P_L$ is, on the other hand, applied upon the governor valve 170 via the line $P_1$. The vehicle speed responsive pressure (governor pressure) $P_G$ may be established immediately after the output shaft 110 has begun to rotate. The relation between the governor pressure $P_G$ and vehicle speed V is shown in FIG. 7.

The governor pressure $P_G$ is introduced to port c of the hold valve 180 via the line $P_{40}$. No pressure is established in the line $P_4$ (also port d of hold valve 180) at the position N of the manual select valve 130. Accordingly the spool 181 is biased rightward by the spring 182 so that port c is communicated with port b, and the output pressure $P_G'$ from the line $P_{41}$ equals pressure $P_G$. No pressure is introduced to the line $P_4$ and port d of the hold valve 180 at position D of the manual select valve. Accordingly the governor pressure $P_G$ is also applied to port d of the modulator vlave 190 in both positions N and D of the manual select valve.

Figure 9:
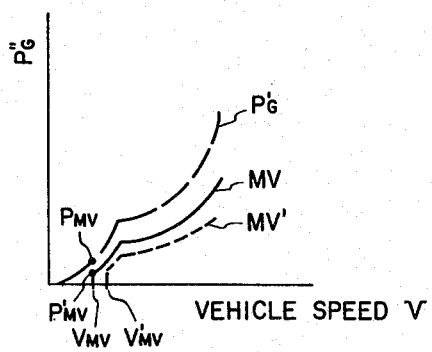
FIG. 9 is a graph showing the relation between the vehicle speed V and the output signal pressure $P_G''$ from the modulator valve.

The output signal pressure $P_G''$ from the modulator valve 190 is generated in the line $P_{42}$ dependently upon the input signal $P_G'$ (=$P_G$ at positions N and D) and traces curve MV as shown in FIG. 9.

The signal pressure $P_G''$ is kept zero by designing the force of the spring 192, ports c and a and the piston 191a until the vehicle speed reaches a given speed $V_{MV}$ (corresponding vehicle speed responsive pressure $P_{MV}$). The pressure $P_G''$ rises up at a pressure $V_{MV}$ and increases in accordance with the pressure $P_G'$ after reaching $P_{MV}'$. A rise up line m at $V=V_{MV}$ in FIG. 10 corresponds to the pressure $P_G''$ which is zero at vehicle speed (0-$V_{MV}$).

Figure 10:
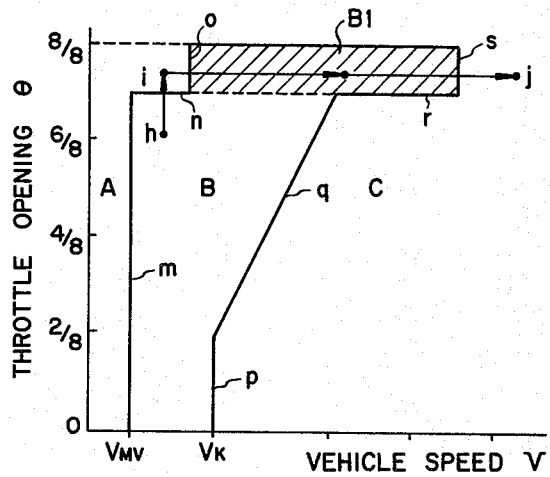
FIG. 10 is a graph showing the relation between vehicle speed V and throttle opening $\theta$ when the hold valve is not operated.

Adjustment of the infinitely variable transmission ratio is accomplished at an area B at the right side ($V>V_{MV}$) of line in FIG. 10 when the throttle opening varies 0 to ⅞. Whereas the transmission ratio is kept at a constant value e (position L) at the left side (0<-V<$V_{MV}$) of line m. Since infinitely variable transmission ratio adjustment is not required dependent upon the engine rotation speed $N_E$ (r.p.m.) or the throttle opening $\theta$ and the vehicle speed V at a low ratio range, such a constant ratio range is advantageous. The vehicle speed $V_{MV}$ from which the infinitely variable adjustment is initiated is determined by presetting the parts of the modulator valve 190, particularly of the spring 192 and arrangement of port c.

When the manual select valve 130 is shifted from position N to drive position D, the line $P_1$ is communicated with the line $P_2$ so that the line pressure $P_L$ is applied to the line $P_2$. As a result, the servo valve 220 is held in a forward position and the clutch is rendered into engagement via the ports a and b and line $P_{10}$. The tongue of the engine E is transmitted to the output shaft 110 from the engine output shaft 101 via the transmission 104, the forward and reverse change gear 108 so that the governor valve 170 rotates to establish a governor pressure $P_G$ responsive to the vehicle speed V. Simultaneously the line pressure $P_L$ is applied to the port b of the throttle valve 160 via the line $P_2$ since the port c of the manual select valve 130 is in communication with ports d and e. The opening of the passage between ports b and c of the throttle valve 160 increases in accordance with the depression of the accelerator pedal to establish a throttle pressure $P_{TH}$ in the line $P_{50}$. By the establishment of pressure in the line $P_{50}$, the throttle pressure $P_{TH}$ is introduced into the port a of the compensation valve 150, the line pressure $P_L$ is introduced into the port c of the valve 150 via the line $P_2$ and the pressure $P_G''$ generated by modulating the pressure $P_G$ from the governor valve 170 is introduced to the port c of the compensation valve 150 via the lines $P_{40}$, $P_{41}$ and $P_{42}$.

As the result, the throttle pressure $P_{TH}$ (pressure responsive to the throttle opening) is applied upon one end of the spool 151 of the compensation valve 150 and the governor pressure $P_G$ (corresponding to vehicle speed) is applied upon the opposite end of the spool 151 so that they counteract each other. The spool 151 slides to the left or right in accordance with the difference between the counteracting pressures $P_{TH}$ and $P_G''$. The spool 151 communicates the port c (line $P_2$) with port d (line $P_{60}$) when the pressure $P_G$ is higher than the pressure $P_{TH}$ or communicates the port d with drain x when adverse.

Now, upon starting of the vehicle (vehicle speed V≃0 and $P_G$≃0), throttle pressure $P_{TH}$ is presumed to slightly increase. At this time the spool 151 of the compensation valve 150 is in the right end of the cylinder. Line pressure $P_{60}$ is zero due to communication between ports d and x. The RCS actuator begins to start from position L. After the vehicle has begun to move at a slight speed, the governor pressure increases correspondingly. However pressure $P_G''$ is maintained zero until the vehicle speed reaches a given value $V_{MV}$, as shown in FIG. 9. Accordingly, the output pressure $P_L$ from the compensation valve 150 is zero so that the RCS actuator 205 is fixed at position L over a range of the vehicle speed V from 0 to $V_{MV}$ ("A" area in FIG. 10). Now, presuming the throttle opening $\theta$ is between 2/8 and ⅞, the vehicle speed V increases to reach the speed $V_{MV}$ after the start, whereupon the output pressure $P_G''$ of the modulator valve 190 suddenly rises up and is allowed to be applied to port e of the compensation valve 150 so that the output pressure $P_L$ is introduced to the line $P_{60}$. The vehicle speed $V_{MV}$ at this instance determines a segment m of vertical line in FIG. 10 and enters into the infinitely variable transmission range B when vehicle speed is higher than $V_{MV}$.

Now supposing that the throttle opening $\theta$ is constant and the throttle pressure $P_{TH}$ is constant. Leftward movement of the spool 151 causes drain x to close. Simultaneously port c is slightly opened (ports c and x will not open simultaneously) so that line pressure $P_L$ is introduced to RCS port a via line $P_2$, ports c, d and line $P_{60}$ dependently upon the vehicle speed V. Accordingly the spool 201 moves slightly rightwards (in an H direction) against the spring 208. At this instance ports f and e of RCS communicate with each other and the line pressure $P_L$ is introduced into the left cylinder (chamber CI) to slightly bias the actuator in an H direction. Then ports d and x are brought into communication by the H direction movement to stop the H direction movement.

When the throttle opening is held within the above-mentioned range a similar operation is repeated with the increase in vehicle speed V until the piston 206b of the actuator 205 abuts the cylinder step 204H, which is a maximum transmission ratio position H. Thereafter the transmission ratio e remains constant and the vehicle speed V is accelerated (in a fixed ratio area C) as far as the output torque surpasses the running resistance. When the accelerator pedal is depressed within a range $\theta<⅞$ for acceleration, the transmission ratio infinitely varies (increase in transmission ratio e) similarly with starting and acceleration operation.

On the other hand, when the acceleration pedal is released, the throttle pressure $P_{TH}$ in line $P_{50}$ suddenly drops and the governor pressure $P_G''$ gradually decreases by inertial running of the vehicle. At this instance engine braking takes affect. When the vehicle speed V further decreases, the adjustment phase is shifted from the range C (fixed to H) to B (infinitely variable transmission ratio).

At this instance, the spool 151 is rapidly moved towards port a to open port c and the line pressure $P_L$ works on the piston 151b to open drain port x so that the line pressure $P_L$ in line $P_{60}$ is rapidly decreased via line $P_{60}$ and port a in response to pressure $P_L$. The spool 201 is retracted leftwards (in an L direction). The pressure in left cylinder chamber CI is decreased by communication between ports d and x so that the actuator 205 moves towards position L to close port d, again to stop. A gradual decrease in pressure $P_G''$ causes the piston 151b to move rightwards and drain x of the compensation valve 150 to open again so that pressure $P_L$ is lowered. Thereafter the transmission ratio is gradually decreased by the L direction retraction of the RCS spool 201 and following retraction of the actuator 205. On deceleration (by brake etc.) for stop, pressure $P_{TH}$ lies zero and $P_G''$ is lowered in accordance with the vehicle speed V. In this case operation of the actuator 205 is similar to that in deceleration at inertial running. However, the travel of actuator movement towards position L is elongated due to a rapid decrease in pressure $P_G''$, thus correspondingly engine brake working takes affect.

Figure 8:
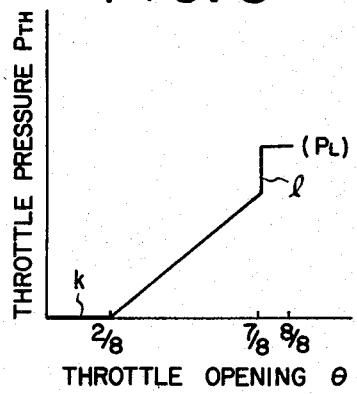
FIG. 8 is a graph showing the relation between the throttle opening of throttle valve and the throttle pressure $P_{TH}$.

The clearance $d_2$ between spools 161 and 162 of the throttle valve 160 is provided in order to rapidly increase the throttle pressure $P_{TH}$ in response to a throttle opening ⅞-8/8 when the acceleration pedal is strongly depressed. The closing of clearance $d_2$ causes the spool 161 to be directly subjected to biasing force of the arm 165 not indirecly via spring 163, and the passage between ports a and b fully opens. Throttle pressure $P_{TH}$ becomes equal to $P_L$. The relation therebetween is shown in FIG. 8. The area K, where the throttle pressure $P_{TH}$ is zero along throttle opening, e.g., 0-2/8, corresponds to the play of throttle, acceleration pedal and link means.

Now the operation of the kickdown valve 140 is described. The kickdown valve 140 operates only at a nearly full throttle opening range ($\theta = ⅞$-8/8) and directly delivers a working pressure $P_K$ to port b of the compensation valve 150 and simultaneously delivers the pressure $P_K$ to port b of the modulator valve 190 via line $P_5$ for adjusting the output pressure $P_G''$ of the modulator valve 190 so as to indirectly play an auxiliary role to the compensation valve 150.

The state "full throttle opening" means a state of temporary depression of the accelerator pedal for shift down as a preliminary step of acceleration, or a state of sudden acceleration or high load (starting, overtaking, upgrade ascending, etc.).

Figure 5A:
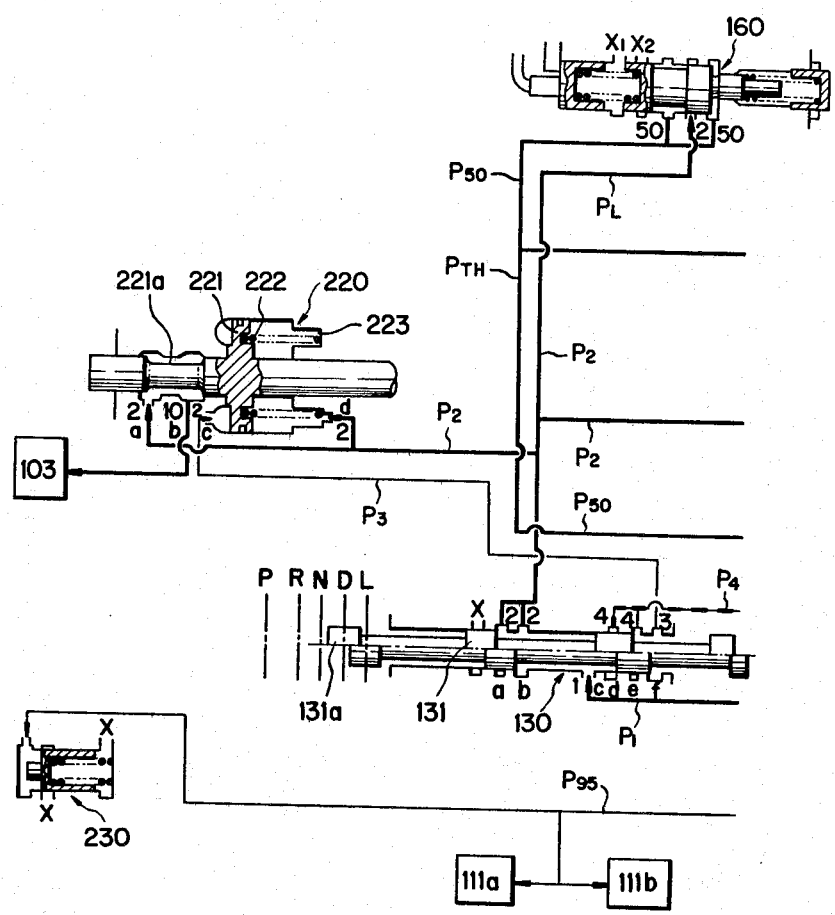
FIGS. 5A, 5B are hydraulic circuitry diagrams shown at a circuit condition when the manual valve is in drive position D.
Figure 5B:
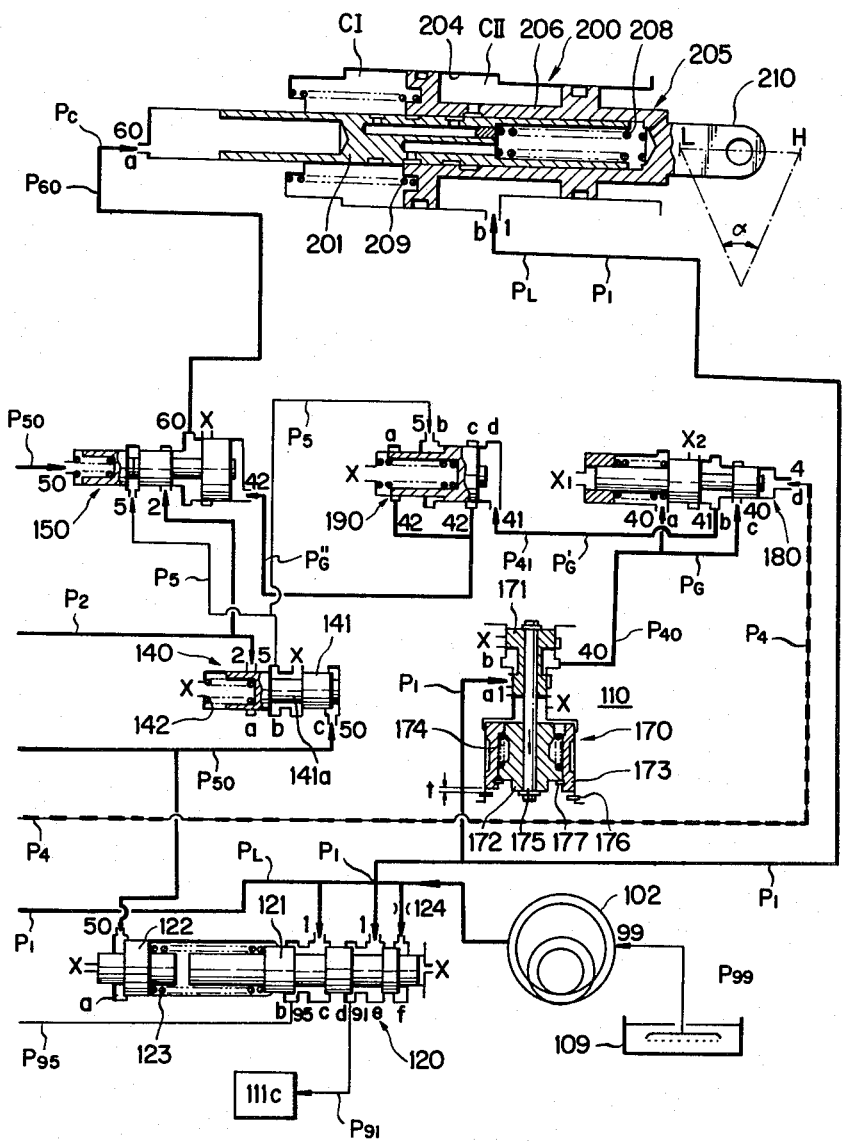

The hydraulic line shown with solid line in FIG. 5 represents that it is applied with the line pressure $P_L$ when the manual valve 130 is in position D. The throttle pressure is thereupon introduced to port c of the kickdown valve 140 via line $P_L$, ports b and a of the throttle valve 160 and line $P_{50}$ and line pressure $P_L$ is introduced to a port a of the kickdown valve 140 from line $P_2$. The line pressure $P_L$ per se is amplified with the throttle pressure $P_{TH}$ as shown in FIG. 6 so that $P_L$ equals $P_{TH}$ when throttle opening lies between ⅞ and 8/8 as shown in FIG. 8. At this instance, the spool 141 of the kickdown valve 140 is moved leftwards by the action of throttle pressure $P_{TH}$ (equal to line pressure $P_L$) as applied to port c to open the passage between ports a and b and to close drain port $x_2$. The output signal pressure $P_K$ in line $P_5$ becomes equal to the pressure $P_L$. Line $P_5$ is communicated with port b of the compensation valve 150 on the one hand, and is communicated with port b of the modulator valve 190 on the other hand for applying line pressure $P_L$ thereto. A rightward pressure of $P_L \cdot A_S$ works upon the piston 151a in port b of the compensation valve 150. The spool 191 of the modulator valve 190 is moved rightwards by the application of the line pressure to the piston 191b assuming the vehicle speed constant momentarily. Thereby port c is closed, port a is opened (ports a and x communicated) and the output pressure $P_G''$ of the line $P_{42}$ (thus in port e of compensation valve 150) decreases by a given value ($\Delta P_G''$) or becomes zero in accordance with pressure $P_G'$ (thus vehicle speed V). Accordingly the spool 151 of the compensation valve is moved rightwards so that the output pressure $P_L$ of the line $P_{60}$ is decreased by a given value ($\Delta P_C$) or becomes zero. When $P_L$ is zero, port c closes (passage between ports c and d closes) and drain port x opens (passage between ports d and x opens). As a result, the actuator 205 of RCS 200 is rapidly moved in the L direction. The actuator 205 reaches position L when the vehicle speed is low while it is radidly moved by a length $\Delta L$ in an L direction to stop at a position before L when the vehicle speed V is high. Actuation of the actuator 205 causing temporary sudden lowering of the transmission ratio e provides operation corresponding to shift down for rapid acceleration and high load. When the input pressure $P_G'$ in port d of the modulator valve 190 (or vehicle speed) is high, the spool 191 of the modulator valve 190 provides an output pressure $P_G''$ which is reduced by a given value ($\Delta P_G''$) in response to pressure $P_G'$ ($=P_G$, vehicle speed V). The output pressure $P_L$ of the compensation valve 150 is suddenly decreased by a given value ($\Delta P_L$) and RCS 200 decreases a transmission ratio e by a given ratio $\Delta e$ whereby shifting down of the transmission ratio is realized in accordance with the vehicle speed.

In the device of the present invention, kickdown operation is accomplished over a range of any vehicle speed V by a sudden depression of the acceleration pedal. As a result, appropriate shifting down may be accomplished when the r.p.m. $N_E$ of the engine is suitably high, thereby readily providing a high torque for the output shaft of the infinetly variable transmission according to needs. The kickdown valve 140 performs a necessary shifting down operation by directly working on the spool 151 of the compensation valve 150 and simultaneously compensatingly decreasing the vehicle speed responsive pressure $P_G''$ applied to the opposite side of the spool 151 of the compensation valve 150 via the modulator valve 190.

As previously described, the kickdown valve 140 is preset to operate at a throttle opening $\theta = ⅞$ for example. As a result segments n, o, r and s of the liner line when $\theta$ is ⅞, ⅞-8/8 (at low speed), ⅞ and ⅞-8/8 (at high speed), respectively, are provided in FIG. 10 showing the characteristics of transmission, thus realizing infinitely variable shifting down in the hatched region B1. The vertical segments o and s correspond to the tracing of $P_{TH} = P_L$ when O is ⅞-8/8 in FIG. 8. The length of horizontal segments n and r correspond to a ratio of sectional areas of pistons 191a to 191b of the spool 190 and the step 1 at $\theta = ⅞$ in FIG. 8. The step 1 in FIG. 8 is determined substantially by presetting the clearance $d_2$ between spools 161 and 162 of the throttle valve and the spring 163 and may be suitably preset in accordance with the relation with counteracting force (pressure receiving area of piston 161a $\times$ line pressure $P_L$) of port c of the throttle valve 160.

Figure 11:
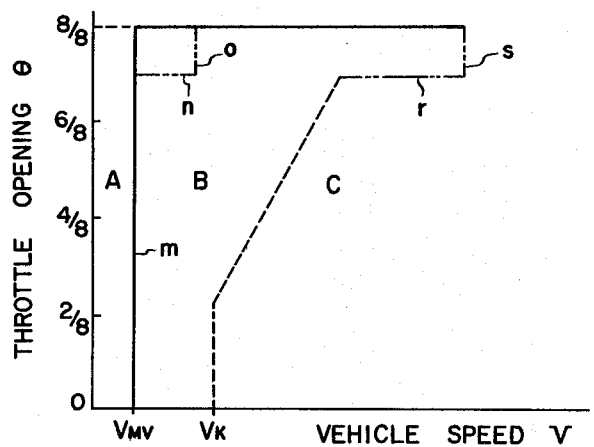
FIG. 11 is a graph showing the same relation as shown in FIG. 10 in which only low transmission ratio fixed area A is defined by modulator valve 190 when the optimal kickdown valve 140 is operated.

For example, when the accelerator pedal is depressed at point h ($\theta = 6/8$) in area B in FIG. 10, the kickdown valve 140 begins to operate and the point h moves up to point i and reaches segment o in accordance with acceleration. The vehicle speed increases under infinitely variable transmission within area B1. Finally, the spool 191 of the modulator valve 190 is moved leftwards by increased pressure $P_G'$ resulting in the point moves accross the segment s to reach point j of area C of ratio H. In such a manner cooperation between the kickdown valve 140 and modulator valve 190 expands the fixed L area A to high speed area having a step at high throttle opening ($\theta \geq ⅞$). A maximum torque may be obtained at the output shaft of the transmission by fixing the transmission ratio to a low ratio $e = L$ at acceleration under high load such as slope ascending. Thus infinitely variable transmission area B1 which is an expansion of infinitely variable transmission area B to high speed area may be formed. Segments m, n and o of the linear line which define a boundary between infinetely variable transmission ratio area B and fixed low ratio area A are established by the cooperation between modulator valve 190 and kickdown valve 140. However in accordance with the present invention, the modulator valve 190 or kickdown valve 140 may solely be used. Segment m in FIG. 11 represents the characteristics of transmission ratio adjustment when the modulator valve 190 is solely used. Two dotted lines n and o represent an operation when the kickdown valve 140 is provided, which corresponds to a state where $V_{MV}$ is zero in FIG. 11.

The operation of the modulator valve 190 in an automatic transmission ratio adjustment is as follows. The relation between r.p.m. $N_E$ (α vehicle speed V) of the engine and torque T of the automatic transmission output shaft at each ratio e is represented by a parabolic curve. The torque is gradually decreased with the increase in $N_E$ after reaching a peak. In conventional automatic transmissions an imaginary point is preset before a balance point between torque T and running resistance of the vehicle is reached and governor pressure P is directly used as vehicle speed responsive pressure for accomplishing shift of transmission ratio. On the contrary to such prior art, in the present invention the governor pressure P which is a conventional vehicle speed responsive pressure may suitably be modulated by the action of the modulator valve 190. This enables such presetting of the shift point that an optimum relation between r.p.m. $N_E$ of engine and torque T of output shaft of the transmission.

In particular, the boundary to the fixed ratio area C ($e=H$) defined by the segment q in FIG. 10 is preset to conform with general requirements for transition to maximum transmission ratio. Firstly, the transmission ratio should be higher than a given minimum value since the output torque becomes lower than the vehicle running resistance in accordance wih the relation between r.p.m. $N_E$ of engine and the output torque when the throttle opening θ is wide. Accordingly, optimum shift points (e→H) are plotted to obtain a segment q in FIG. 10. Secondly, the transmission ratio e should be low (automatically adjusted) when the vehicle speed is not high (V=medium) as the engine noise becomes high relative to the lowering of vehicle speed at a constant r.p.m. of $N_E$.

The shift signal at an optimum r.p.m. $N_E$ of engine consists of an output signal pressure $P_C$ of the compensation valve 150 obtained by regulating the line pressure $P_L$ in propotion to the throttle pressure $P_{TH}$ by means of the compensation valve 150 into which an output signal $P_G''$ of the modulator valve 190 is input as one input signal and a throttle pressure $P_{THL}$ responsive to throttle opening (indirectly responsive to $N_E$) is input as the other input signal.

The area K in FIG. 8 in which throttle pressure $P_{TH}$ is zero defines a rise up segment p ($θ=0$-2/8) in FIG. 10. The pressureless area K is provided for holding the transmission ratio e to a relatively low value preventing the ratio e from changing to H position at a speed lower than a given speed $V_K$ and to prevent the lacking in torque (Knocking etc.) as well as to neglect the influence of error in throttle pressure $P_{TH}$ due to difficulty in precise detection of zero or nearly zero position of the throttle opening. In the throttle pressure area K engine operates at a suitable low r.p.m. $N_E$ while the vehicle speed responsive pressure $P_G''$ is held zero (i.e., $e=L$ fixed) at $V=0$-$V_{MV}$ and thereafter is converted into output signal pressure $P_G''$ from the modulator valve 190 represented by a tracing MV in FIG. 9 at $V_{MV} \leq V < V_K$. Accordingly, the spool 151 moves leftwards in compensation valve 150 so that output signal pressure $P_L$ is generated in the line $P_{60}$ in response to vehicle speed V ($P_G''$) to adjust the transmission ratio into a suitable ratio e by actuating the actuator 205 of RCS 200. Since throttle pressure $P_{TH}$ is zero at throttle opening $θ=0$ to 2/8, the position H defining upper transmission ratio is determined dependently upon the vehicle speed V ($P_G''$), thus representing a segment p in FIG. 10.

In addition, at $2/8 \leq θ < \frac{7}{8}$ and $V \geq V_K$ the segment q dependent upon throttle pressure $P_{TH}$ and vehicle speed responsive pressure $P_G''$ defines the lower boundary of the area where transmission ratio is fixed at H.

In position R (reverse movement) of the manual valve 130 port c is communicated with port f to introduce line pressure to the line $P_3$. Thus the servo valve 220 is brought into a reverse (right) position to render the forward and rearward movement changing means 108 into rearward position through fork shaft 223. Ports c and b of the servo valve 220 are communicated each other to engage the clutch 103.

On the other hand, output pressure $P_G''$ is applied to port e of the compensation valve 150 from the modulator valve 190 via line $P_1$, governor valve 170, line $P_{40}$, hold valve 180 and line $P_{42}$. However, the line $P_2$ is not pressurized and a throttle pressure is not introduced to line $P_{60}$ although the throttle is opened. Accordingly, the spool 151 is slightly urged leftwards along the increase in rearward vehicle speed V, bringing port c into communication with port d so that line $P_{60}$ is brought into communication with line $P_2$. The line $P_2$ is not applied with a pressure since it is communicated with drain x of the manual valve 130. The spool of RCS is retracted to a position L at the RCS left and since no pressure is applied to line $P_{60}$. Thus transmission ratio e is fixed to a minimum value L under manual selection of reverse R.

When the manual valve 130 is in parking position P, port f is closed so that line $P_{10}$ is not applied with a pressure to render clutch 103 into disengagement. Line pressure $P_L$ is applied to RCS. Line $P_{60}$ is not pressurized since line $P_2$ is not pressurized. The actuator of RCS is in position L.

Now operation of the hold valve will be explained.

The spool 181 of the manual valve 130 operates in accordance with equation (6). When the manual valve 130 is shifted from position D to position L during running of vehicle, the line pressure $P_L$ is applied to port d via line $P_4$ and biasing force in a left direction is applied on the spool 181. To the port a of the manual select valve 130 is applied a first vehicle responsive pressure (governor pressure) $P_G$ via line $P_{40}$ to apply the spool 181 with a biasing force in a left direction together with spring 182. As a result, line pressure $P_L$ in line $P_4$ moves the spool 181 of hold valve 180 leftwards against the biasing force exerted by the spring 181 and pressure $P_G$ in such a manner that the port c of valve 180 is closed and output pressure $P_G'$ from the hold valve 180 is lowered. Furthermore the output pressure $P_G''$ of modulator valve 190 decreases to move the spool 151 of compensation valve 150 rightwards. Thus, the output pressure $P_G'$ which has equaled pressure $P_G$ in position D of manual valve 130 is regulated in accordance with the counteraction between line pressure $P_L$ and governor pressure $P_G$ (first vehicle speed responsive pressure)

after the manual valve 130 is shifted to position L of manual valve 130.

The decreased output signal pressure $P_G'$ of hold valve 130 is a second vehicle speed responsive pressure. The pressure $P_G'$ is regulated into the output signal pressure $P_G''$ represented by a curve MV' in FIG. 9 by means of the modulator valve 190. The pressure $P_G''$ acts upon piston portion 151$b$ of the spool 151 of compensation valve 150.

On the other hand, assuming the throttle opening $\theta$ constant (provided $0 \leq O \leq \frac{2}{8}$) the spool 151 of compensation valve 150 moves rightwards in accordance with pressure drop $\Delta P_G''$ of $P_G''$ to correspondingly decrease the output signal pressure $P_C$. The pressure $P_L$ becomes zero when vehicle speed V is low, whereat port d is communicated with port x.

Figure 12:
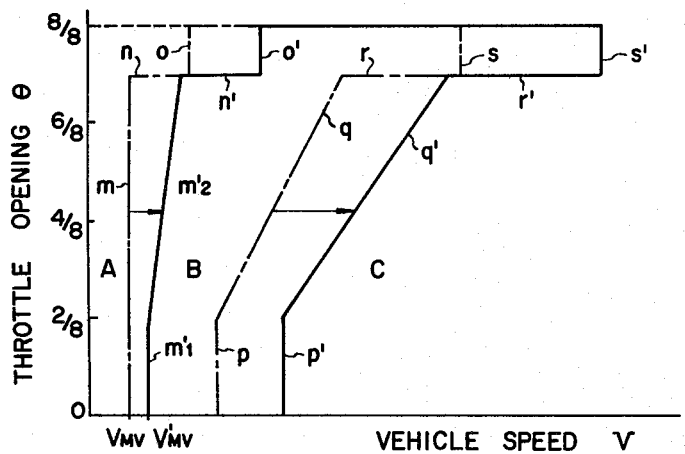
FIG. 12 is a graph showing the same relation as shown in FIG. 10 when hold valve is operated.

A decrease in the signal pressure $P_C$ causes the spool 201 of RCS 200 to move leftwards in order to move RCS actuator 205 by a substantial length in a left (L) direction. Accordingly when the manual select valve 130 is manually shifted from position D during running at a constant speed, the transmission ratio e in position D is decreased by $\Delta e_1$ corresponding to the current speed $V_1$ (provided that $\theta$ is constant). As a result the vehicle speed $V_{MV}$ difining the boundary between low transmission ratio (L) fixed area A and the infinitely variable transmission ratio B is changed to $V'_{MV}$ at a higher speed area, and the transmission ratio L fixed area A is moved to a higher speed area (FIG. 12). When the accelerator pedal is depressed to cause the throttle opening to be $\frac{2}{8}$ to 8/8, segment o defined by operation of the kickdown valve 140 is moved to position Q' at a higher speed area and the transmission ratio (L) fixed area A is enlarged.

As a result, a transmission ratio $e_1$ which was for example in a infinitely variable ratio area B when the manual select valve 130 was in position D enters transmission ratio (L) fixed area A which was expanded to a higher speed area when the vehicle speed V was medium. Here, the vehicle is accelerated when throttle opening $\theta$ is assumed constant. When the vehicle speed V is high and in area B, the transmission ratio decreases by a given amount ($\Delta e_1$) to accomplish shifting down. Here, if the throttle opening $\theta$ is assumed constant, the vehicle is accelerated. When V is still higher and falls in the maximum transmission ratio (H) fixed area C, the ratio lies in an expanded area B to the high speed side. Thus a higher torque for sudden acceleration etc. may properly be obtained in accordance wih a current vehicle speed.

Here, when $\theta$ is made zero, the transmission ratio is shifted down in accordance with the current vehicle speed to cause engine brake to effectively work. This is advantageous on brake working, slope (downgrade) descending etc.

As previously described, the output signal pressure $P_G'$ of hold valve 130 is controlled through the line pressure $P_L$ in accordance with throttle opening $\theta$. The operation accompanied by change in throttle opening $\theta$ will be described hereinbelow.

Although the output signal pressure $P_G'$ of hold valve 180 is depicted by a curve HV in FIG. 7, the curve HV is not stationary. The reduced pressure $\Delta P_G$ due to input signal pressure (governor pressure $P_G$) of hold valve 180 traces a curve having a gradient between the curve HV (suppose $\theta$ is maximum) and the curve $P_G$ in accordance with a throttle opening $\theta$ at each moment. Thus the scale of the pressure drop ($\Delta P_L$) of the output signal pressure $P_G''$ from modulator valve 190 and thus that $P_C$ of the compensation valve 150 varies depending upon throttle opening $\theta$ as well as current vehicle speed. This pressure drop ($\Delta P_C$) defines range depth of the shift down made.

Thus, segments m-n-o and p-q-r-s which are respective boundaries between areas A and B, and areas B and C shown in FIG. 10 of the transmission ratio characteristic when the hold valve 180 is not operated are shifted to segments $m_1'$-$m_2'$-n'-o' and p'-q'-r'-s' in FIG. 12 respectively when the hold valve is operated. In particular segments m and q are shifted to higher speed area along the increase in throttle opening O. Segment m is divided into rising vertical segment $m_1'$ and slanted segment $m_2'$. Segment $m_1'$ corresponds to the segment K as shown in FIG. 8 in which throttle pressure is zero when $\theta$ is 0 to 2/8. Horizontal segments n' and r' are also extended at throttle opening ($\theta = \frac{7}{8}$).

The expansion distances between m and m' and p and p' are defined by the design of the hold valve 180, i.e., presetting of each left side member of the equation (6).

Thus the gradients of segments $m_2'$ and q' and extension scale of segments n' and r' are also dependent upon the relation (gradient) between throttle opening $\theta$ and line pressure $P_L$, and upon the gradient etc. of the first vehicle responsive pressure $P_G$. Equation (6) reveals that the increase in line pressure $P_L$ causes the decrease in the output pressure $P_G'$ of hold valve 180.

In the present embodiments, the line pressure $P_L$ which increases in response to the throttle pressure $P_{TH}$ is used as an input signal of the hold valve 180 as shown in FIG. 6 since it is prefarable that the transmission ratio e is held relatively as low as possible when high torque is required for starting, sudden acceleration, slope ascending and high loading etc whereat the throttle opening $\theta$ is usually high. However the dependency of line pressure $P_L$ upon throttle pressure $P_{TH}$ is not always essential. The transmission characteristic curve takes a form in which area B in FIG. 10 is moved to the right (high speed area) by a given length.

The vehicle starts from a position in which the transmission ratio is fixed at the area B by the shift operation of position D to L of the manual select valve 130. When throttle opening $\theta$ is at a constant medium value, the vehicle is accelerated to gradually increase the pressure $P_G$ while the transmission ratio e is held at position L; finally the resultant force of biasing force of the spring 182 and acting force applied to port a due to the pressure $P_G$ surpasses the biasing force applied to port d due to the line pressure $P_L$. At this moment, the spool 181 is slightly moved rightwards to render port c to communicate with port b to generate a regulated output pressure $P_G'$ (second vehicle responsive pressure). The pressure $P_G'$ is regulated into pressure $P_G''$ (curve MV' in FIG. 9) by the modulator valve 190. The pressure $P_G''$ acts upon the compensation valve 150 to increase pressure $P_L$ which has been zero, the transmission ratio phase enters the infinitely variable area B in which transmission ratio e increases with the increase in vehicle speed between positions L and H. When the vehicle speed V further increases, the transmission ratio e is fixed to position H, where the transmission phase enters the area C.

At this stage, the boundaries of each area are moved as shown in FIG. 12 when throttle opening $\theta$ is $\frac{2}{8}$ to 8/8.

In the present invention a follow-up type actuator other than that shown in the embodiment may be used as a transmission ratio control servo RCS provided that such would render a similar function without departing from the gist of the present invention. Furthermore, the system of the present invention is adapted to fluidly-operated transmission as well as mechanically-operated transmission.

Accordingly, the system for controlling the transmission ratio of an infinitely variable transmission in the present invention provides:

First, an infinitely variable control of the transmission ratio e within a range between L and H positions which is accomplished by follow-up-wisely actuating a spring-backed spool in an actuator of transmission ratio control servo RCS against the spring force in accordance with the signal pressure established by the compensation valve through the equilibrium between pressures responsive to the vehicle speed and throttle opening;

Second, a transmission characteristic diagram having a low ratio (L) fixed area, infinitely variable ratio area and high ratio (H) fixed area due to cooperation of the modulator valve 190 and kickdown valve 140; which system is capable of properly responding to gradual or sudden changes in throttle opening and vehicle speed:

Third, expanding the low ratio (L) fixed area and infinitely variable area towards a higher speed area due to the regulating control to the vehicle speed responsive pressure by the hold valve 180 operated by manual lock-up shifting in the manual select valve 130, which ratio area expanding serves to effective shift down function responsive to any vehicle speed. The whole functions provided by the system of the present invention are essential for driving a vehicle.

Obviously, numerous modifications and variations of the present invention are possible in light of the above teachings. It is therefore to be understood that within the scope of the appended claims, the invention may be practiced otherwise than as specifically described herein.

What is claimed is:

1. A system for controlling the transmission ratio of an infinitely variable transmission for automotive vehicles including means for producing a line pressure, means for producing a pressure response to throttle opening, means for producing a pressure responsive to vehicle speed, means in the infinitely variable transmission for changing the transmission ratio thereof, and a valve for manually selecting the transmission ratio area, comprising:

servo means for controlling said transmission ratio changing means wherein the servo means further comprises a spool for controlling said servo means and which is operated in response to an input signal pressure thereon and controls the line pressure to be applied to drive the servo means;

kickdown valve means for generating an output signal pressure responsive to a throttle responsive pressure;

a modulator valve which is actuated by means of a vehicle speed responsive pressure applied against a spring force and the output signal pressure of said kickdown valve means exerted additionally to said spring force, the modulator valve regulating said vehicle speed responsive pressure into an output pressure;

a compensation valve which regulates the line pressure into a regulated output pressure by means of said output pressure of the modulator valve and the throttle opening responsive pressure exerted against said output pressure of the modulator valve, said regulated output pressure acting against the modulator valve output pressure in the compensation valve thereby providing said input signal pressure of the servo means; wherein said kickdown valve means output signal pressure is additionally exerted on the compensation valve against the modulator valve output pressure.

2. A system for controlling the transmission ratio of an infinitely variable transmission for automotive vehicles including means for producing a line pressure, means for producing a pressure responsive to throttle opening, means for producing a pressure responsive to vehicle speed, means in the infinitely variable transmission for changing the transmission ratio thereof, and a valve for manually selecting the transmission ratio area, comprising:

servo means for controlling said transmission ratio changing means, wherein the servo means further comprises a spool for controlling said servo means and which is operated in response to an input signal pressure thereon and controls the line pressure to be applied to drive the servo means;

kickdown valve means for generating an output signal pressure responsive to a throttle opening responsive pressure;

a modulator valve which is actuated by means of a vehicle speed responsive pressure applied against a spring force and the output signal pressure of said kickdown valve means exerted additionally to said spring force, the modulator valve regulating said vehicle speed responsive pressure into an output pressure and holding the output pressure at zero within a predetermined vehicle speed responsive pressure; and a compensation valve which regulates the line pressure into a regulated output pressure by means of said output pressure of the modulator valve and the throttle opening responsive pressure exerted against said output pressure of the modulator valve, said regulated output pressure acting against the modulator valve output pressure in the compensation valve thereby providing said input signal pressure of the servo means; said kickdown valve means output signal pressure being additionally exerted on the compensation valve against the modulator valve output pressure and wherein a transmission ratio fixed area is established at a low vehicle speed side by fixing said servo means at a minimum transmission ratio position within the predetermined vehicle speed.

3. The system as defined in claim 1 or 2 wherein the servo means further comprises:

a spring-backed spool to which said input signal pressure from said compensation valve provides a transmission ratio control signal pressure responsive to both the throttle opening and the vehicle speed and which is applied against the spring force; and an actuator axially slidable in a cylinder, the actuator being operatively connected with the transmission ratio changing means and actuated by the line pressure, wherein the spool further comprises control valve means for controlling the line pressure for actuating the actuator, and causing the actuator to slide toward the increase or decrease of the transmission ratio in response to the input signal pressure to the spring-backed spool.

4. The system as defined in claim 1 or 2, wherein the control valve means to control the line pressure for actuating the actuator further comprises means for applying a counteracting force to the actuator against each actuator slide motion response to the increase or decrease of the input signal, respectively.

5. The system as defined in claim 4, wherein the compensation valve further comprises a spool slidably arranged in a cylinder, the spool regulating the line pressure to convert said line pressure into the transmission ratio control input signal pressure by means of the vehicle speed responsive pressure applied on one end of the spool and the throttle opening responsive pressure applied on the opposite end thereof.

6. The system as defined in claim 5, wherein the spool of the compensation valve further comprises means for regulating the line pressure by defining a passage communicating a line pressure inlet port and a transmission ratio control signal pressure outlet port, and a passage communicating the outlet port to a drain port; and wherein the regulated line pressure in said passage is counteractingly applied to the spool against the vehicle speed responsive pressure.

7. The system defined in claim 6, wherein the spool further comprises a passage alternatively communicating the line pressure inlet port to the transmission control signal pressure outlet port or this control signal pressure outlet port to a drain port due to the slide motion thereof, the passage being defined in the cylinder between two piston portions of the spool, and the vehicle speed responsive pressure being applied on one piston portion of the spool with a larger section counteractingly against the regulated line pressure applied on the opposite side of the larger piston portion, provided that the openings of the drain port and line pressure inlet port are alternatively regulated by the lands of said piston portions, respectively.

8. The system defined in claim 5, wherein said spool in the compensation valve includes a piston portion to which the output signal pressure of said valve means is applied against the output signal pressure of the modulator valve.

9. The system as defined in claim 2, wherein said valve means is actuated by a predetermined throttle opening responsive pressure responding to an approximately maximum throttle opening thereby producing an output signal pressure.

10. The system as defined in claim 2 or 9, wherein the output signal pressure of said valve means is exerted on the modulator valve against the vehicle speed responsive pressure and simultaneously on the compensation valve against the modulator valve output pressure, whereby the transmission ratio fixed area is expanded towards a high vehicle speed area.

11. The system as defined in claim 2 or 9, wherein the output signal pressure of said kickdown valve means comprises the line pressure.

12. The system as defined in claim 7, whrein the compensation valve means allows the transmission ratio control signal pressure to increase if the balance of forces applied on the spool is favored toward the vehicle speed responsive pressure, and to decrease if said balance is unfavored.

13. The system as defined in claim 7, wherein the pressure line port is regulated by a land of the piston of a smaller section, whereas the drain port is regulated by a land of the piston with a larger section.

14. The system as defined in claim 9, wherein the output signal pressure of said valve means is exerted on the modulator valve against the vehicle speed responsive pressure and simultaneously on the compensation valve against the modulator valve output pressure, whereby the transmission ratio fixed area is expanded towards a high vehicle speed area.

15. The system as defined in claim 14, wherein the output signal pressure of the kickdown valve is composed of the line pressure.

16. A system for controlling the transmission ratio of an infinitely variable transmission for automotive vehicles including means for producing a line pressure, means for producing a pressure responsive to throttle opening, means for producing a pressure responsive to vehicle speed, means in the infinitely variable transmission for changing the transmission ratio thereof, and a valve for manually selecting the transmission ratio area, comprising:

servo means for controlling said transmission ratio changing means, wherein the servo means further comprises a spool for controlling said servo means and which is operated in response to an input signal pressure thereon and controls the line pressure to be applied to drive the servo means;

kickdown valve means for generating an output signal pressure responsive to a throttle opening responsive pressure;

hold valve means for generating an output pressure as a second vehicle speed responsive pressure which pressure alternatively consists of either, when the line pressure is applied by means of the manual select valve, a regulated first vehicle speed responsive pressure, or, when no line pressure is applied, the nonregulated first vehicle speed responsive pressure;

a modulator valve which is actuated by means of the second vehicle speed responsive pressure applied against a spring force and the output signal pressure of said kickdown valve means exerted additionally to said spring force, the modulator valve regulating the second vehicle speed responsive pressure into an output pressure;

a compensation valve which regulates the line pressure into a regulated output pressure by means of said output pressure of the modulator valve and the throttle opening responsive pressure exerted against said output pressure of the modulator valve, said regulated output pressure acting against the modulator valve output pressure in the compensation valve thereby providing said input signal pressure of the servo means;

said valve means output signal pressure being additionally exerted on the compensation valve against the modulator valve output pressure; provided that a transmission ratio fixed area is established at a low vehicle speed side by fixing said servo means at a minimum transmission ratio position within the predetermined vehicle speed.

17. The system as defined in claim 16, wherein said hold valve means further comprises a springbacked spool on which the first vehicle responsive pressure acting against the spring force and the line pressure is applied in the same direction with the first vehicle responsive pressure, so that the hold valve means regulates the first vehicle responsive pressure into zero or a reduced output pressure when the line pressure is applied.

18. The system as defined in claim 16, wherein the line pressure varies depending upon the throttle opening.

19. The system as defined in claim 18, wherein the manual select valve has at least first and second positions, the manual select valve supplying no line pressure to the hold valve means at the first position whereat in an order from low speed a minimum transmission ratio fixed area, an infinitely variable transmission ratio area and a maximum transmission ratio fixed area are established and the ratio varies over those areas in accordance with the vehicle speed and throttle opening; and the manual select valve means supplying the line pressure onto the hold valve means at the second position whereat the minimum transmission ratio fixed area and the infinitely variable transmission ratio area are expanded or shifted toward the high vehicle speed area depending upon the vehicle speed.

20. The system as defined in claim 19, wherein at said second position the minimum transmission ratio fixed area and the infinitely variable transmission ratio area are expanded or shifted toward the high vehicle speed area according to the vehicle speed and throttle opening.

21. A system for controlling the transmission ratio of an infinitely variable transmission for automotive vehicles including means for producing a line pressure, means for producing a pressure responsive to throttle opening, means for producing a pressure responsive to vehicle speed, means in the infinitely variable transmission for changing the transmission ratio thereof, and a valve for manually selecting the transmission ratio area, comprising:

servo means for controlling said transmission ratio changing means, the servo means being controlled by means of a spool which is operated in response to an input signal pressure thereon and controls the line pressure to be applied to drive the servo means;

kickdown means for generating an output signal pressure responsive to a throttle opening responsive pressure;

hold valve means for generating an output pressure as a second vehicle speed responsive pressure which pressure alternatively consists of either, when the line pressure is applied by means of the manual select valve, a regulated first vehicle speed responsive pressure, or, when of line pressure is applied, the nonregulated first vehicle speed responsive pressure;

a modulator valve which is actuated by means of the second vehicle speed responsive pressure applied against a spring force and the output signal pressure of said kickdown valve means exerted additionally to said spring force, the modulator valve regulating the second vehicle speed responsive pressure into an output pressure and holding the output pressure at zero within a predetermined vehicle speed responsive pressure;

a compensation valve which regulates the line pressure into a regulated output pressure by means of said output pressure of the modulator valve and the throttle opening responsive pressure exerted against said output pressure of the modulator valve, said regulated output pressure acting against the modulator valve output pressure in the compensation valve thereby providing said input signal pressure of the servo means;

said valve means output signal pressure being additionally exerted on the compensation valve against the modulator valve output pressure; provided that the servo means is fixed to a minimum transmission ratio position to establish a minimum transmission ratio fixed area, which fixed minimum ratio area is expanded toward a high speed area by applying said line pressure onto the hold valve means.

22. The system as defined in claim 21, wherein the line pressure varies depending upon the throttle opening.

23. The system as defined in claim 21, wherein said valve means is actuated by a predetermined throttle opening responsive pressure responding to an approximately maximum throttle opening thereby producing an output signal pressure.

24. The system as defined in claim 21, wherein the output signal pressure of said kickdown valve means is exerted on the modulator valve against the second vehicle speed responsive pressure and simultaneously on the compensation valve against the modulator valve output pressure, whereby the minimum transmission ratio fixed area is expanded towards a high vehicle speed area.

25. The system as defined in claim 24, wherein the output signal pressure of said kickdown valve means is composed of the line pressure.

26. The system as defined in claim 21, wherein the hold valve means regulates the first vehicle speed responsive pressure into zero or a reduced pressure when the line pressure is applied thereon.

27. The system as defined in any one of claims 21 or 22–25, wherein the manual select valve has at least D and L positions, the manual select valve supplying no line pressure to the hold valve means at D position whereat in an order from low speed a minimum transmission ratio fixed area, an, infinitely variable transmission ratio area and a maximum transmission ratio fixed area are established and the ratio varies over those areas in accordance with the vehicle speed and throttle opening; and the manual select valve means supplying the line pressure onto the hold valve means at L position whereat the minimum transmission ratio fixed area and the infinitely variable transmission ratio area are expanded or shifted toward the high vehicle speed area depending upon the vehicle speed.

28. The system as defined in claim 27, wherein at said position L the minimum transmission ratio fixed area and the infinitely variable transmission ratio area are expanded or shifted toward the high vehicle speed area according to the vehicle speed and throttle opening.

29. The system as defined in claim 1, 2, 16 or 21, wherein the actuator includes a first piston and a second piston of different effective sections defining a first chamber at the cylinder bottom and a second chamber between the first and second pistons, so that the actuator position is determined due to the balance of forces exerted on both pistons produced by each pressure in the first and second chambers, the actuator includes a center bore extending through the second chamber, and the spring-backed spool is slidably arranged in an actuator piston center bore and coaxially in a small bottom cylinder defining a center bottom chamber receiving the input signal pressure, so that the spring-backed spool in a following-up manner regulates the pressures of both first and second chambers by alternatively communicating the first and second chambers or the second chamber to a drain port.

30. The system as defined in claim 29, wherein the spring-backed spool includes a first passage communicating the first and second chambers and a drain passage permitting to discharge the pressure from the first chamber and the spring-backed spool is biased by a spring retained by the actuator.

31. The system as defined in claim 30, wherein a change in the control signal pressure permits the spring-backed spool to relatively slide with respect to the actuator position thereby allowing the actuator to follow the spool movement until reaching a position defined by a newly established pressure balance through the communication or discommunication between the first and second chambers or between the first chamber and the drain port, respectively at each pressure change.

32. The system as defined in claim 31, wherein the actuator is biased in one direction by a spring exerting a force counteracting against the piston force having a larger effective section.

33. The system as defined in claim 1, 2, 16 or 21, wherein the increase in the input signal pressure causes the actuator to urge so that the transmission ratio increases.

34. The system as defined in claim 1, 2, 16 or 21, wherein the first chamber receives the actuator piston having a larger effective section so as to allow this piston to slide within a predetermined range.

35. The system as defined in claim 1, 2, 16 or 21, wherein the line pressure is supplied to the second chamber.

36. The system as defined in claim 1, 2, 16 or 21, wherein the drain port is opened if said balance is unfavoured toward the vehicle speed responsive pressure.

* * * * *

UNITED STATES PATENT AND TRADEMARK OFFICE
CERTIFICATE OF CORRECTION

PATENT NO. : 4,466,312

DATED : August 21, 1984

INVENTOR(S) : Tomio Oguma

It is certified that error appears in the above-identified patent and that said Letters Patent is hereby corrected as shown below:

At Column 23, line 42, change "response" to --responsive--.

At Column 25, line 59, change "whrein" to --wherein--.

Signed and Sealed this

Twenty-seventh Day of August 1985

[SEAL]

Attest:

DONALD J. QUIGG

Attesting Officer        Acting Commissioner of Patents and Trademarks